US012729569B2

(12) United States Patent
Yoshimoto et al.

(10) Patent No.: US 12,729,569 B2
(45) Date of Patent: Sep. 8, 2026

(54) DOOR LATCH DEVICE

(71) Applicant: U-SHIN LTD., Nagano (JP)

(72) Inventors: Munehiro Yoshimoto, Hiroshima (JP); Yuki Higashibata, Hiroshima (JP)

(73) Assignee: U-SHIN LTD., Nagano (JP)

( * ) Notice: Subject to any disclaimer, the term of this patent is extended or adjusted under 35 U.S.C. 154(b) by 61 days.

(21) Appl. No.: 18/884,578

(22) Filed: Sep. 13, 2024

(65) Prior Publication Data

US 2025/0101775 A1 Mar. 27, 2025

(30) Foreign Application Priority Data

Sep. 26, 2023 (JP) ................................ 2023-163211

(51) Int. Cl.
*E05B 81/06* (2014.01)
*E05B 81/14* (2014.01)
*E05B 85/24* (2014.01)

(52) U.S. Cl.
CPC .............. *E05B 81/14* (2013.01); *E05B 81/06* (2013.01); *E05B 85/243* (2013.01)

(58) Field of Classification Search
CPC ........ E05B 81/14; E05B 81/06; E05B 85/243; E05B 81/34; E05B 81/40
See application file for complete search history.

(56) References Cited

U.S. PATENT DOCUMENTS

| | | | | |
|---|---|---|---|---|
| 2018/0171680 A1* | 6/2018 | Hunt | ........................ | E05B 81/28 |
| 2018/0171681 A1* | 6/2018 | Hunt | ........................ | E05B 81/40 |
| 2019/0106925 A1* | 4/2019 | McCorkell | .............. | F16H 25/24 |
| 2022/0186529 A1* | 6/2022 | Cumbo | ................... | E05B 83/38 |
| 2022/0341227 A1* | 10/2022 | Ernst | .................... | B61D 19/005 |

FOREIGN PATENT DOCUMENTS

| | | | | |
|---|---|---|---|---|
| DE | 10344244 A1 * | 4/2004 | ............. | E05B 81/14 |
| DE | 102018128579 A1 * | 5/2019 | ............. | E05B 81/20 |
| JP | 2011-094346 A | 5/2011 | | |

* cited by examiner

*Primary Examiner* — Kristina R Fulton
*Assistant Examiner* — Thomas L Neubauer
(74) *Attorney, Agent, or Firm* — Chrisman Gallo Tochtrop LLC

(57) ABSTRACT

A door latch device includes a base having an insertion groove, a fork pivotally supported by a fork shaft on one side of the insertion groove **14*d***, a claw pivotally supported by a claw shaft on the other side of the insertion groove, an opening lever disposed in a manner spaced apart from the claw in an axial direction of the claw shaft, and a driving mechanism for rotating the opening lever. After the opening lever is rotated to cause the fork restricting portion to restrict a rotation of the fork toward the open position, and to cause the claw actuating portion to rotate the claw from the abutting position to the non-abutting position, the fork restricting portion ceases to restrict the rotation of the fork toward the open position, with the claw actuating portion restricting the rotation of the claw toward the abutting position.

11 Claims, 21 Drawing Sheets

OPENING LEVER:INITIAL POSITION

FORK (FORK LEVER):LATCHING POSITION

OPENING LEVER: RESTRICTION END POSITION
FORK (FORK LEVER): LATCHING POSITION

DOOR LATCH DEVICE

CROSS-REFERENCE TO RELATED APPLICATIONS

This application claims the benefit of Japanese Application No. 2023-163211, filed Sep. 26, 2023, the entire disclosures of which are hereby incorporated herein by reference.

TECHNICAL FIELD

The present invention relates to a door latch device.

BACKGROUND ART

The door latch device disclosed in JP 2011-94346 A includes a fork, a claw, and a disk-shaped actuating member. The fork is rotatable to an open position where the striker can be released, a latching position for holding the striker, and an over-latching position further away from the open position than the latching position. The claw is rotatable to an abutting position abutting against the fork at the latching position, and a non-abutting position where the abutment against the fork is released. The actuating member has a fork actuator pin for rotating the fork and a claw actuator pin for rotating the claw, and the actuating member is rotated by a motor.

When the door is to be opened, the motor rotates the actuating member approximately 180 degrees in a first direction. This rotation at first causes the fork actuator pin to rotate the fork from the latching position to the over-latching position, and then causes the claw actuator pin to rotate the claw from the abutting position to the non-abutting position. The fork actuator pin then gradually rotates the fork toward the open position, and then ceases to restrict the fork, so that the fork is rotated to the open position. This structure inhibits a sudden rotation of the fork from the latching position to the open position, due to the elastic force of a weather strip for providing sealing between the vehicle body and the door, and suppresses not only the vibration of the fork due to this sudden rotation, but also generation of the abnormal sound resultant of the door or the like resonating with the vibration.

SUMMARY

In the door latch device according to JP 2011-94346 A, the disk-shaped actuating member is disposed adjacently to the fork and the claw on the same plane. This configuration requires a large area for placing the fork, the claw, and the actuating member. Therefore, there still is a room for improvement in reducing the size of the door latch device according to JP 2011-94346 A.

An object of the present invention is to reduce the size of a door latch device capable of automatically opening a door.

The present invention provides a door latch device including: a base that has an insertion groove into which a striker is insertable; a fork that is mounted on a fork shaft disposed on the base, on one side of the insertion groove, the one side being one side in a direction intersecting with a direction in which the insertion groove extends, that is rotatable between a latching position for holding the striker and an open position at which the striker is releasable, and is biased in a direction from the latching position toward the open position by a biasing member; a claw that is pivotally supported by a claw shaft disposed on the base, on another side of the insertion groove in the direction intersecting with direction in which the insertion groove extends, and extending along the fork shaft, that is rotatable between an abutting position where the claw comes into abutment against the fork at the latching position and a non-abutting position where the abutment against the fork is released and the fork is allowed to be rotated by the biasing member; an opening lever that includes a fork restricting portion configured to restrict a rotation of the fork toward the open position, and a claw actuating portion configured to rotate the claw from the abutting position to the non-abutting position, that is pivotally supported on the base on the other side of the insertion groove, and that is disposed spaced apart from the claw in an axial direction of the claw shaft; and a driving mechanism that rotates the opening lever from an initial position to a first rotational position spaced apart from the initial position, a second rotational position further away from the initial position than the first rotational position, and a third rotational position further away from the initial position than the second rotational position, in which when the opening lever is at the initial position, the fork restricting portion allows the fork to rotate, and the claw actuating portion keeps the claw at the abutting position, a rotation of the opening lever from the initial position to the first rotational position causes the fork restricting portion to restrict rotation of the fork toward the open position, a rotation of the opening lever from the first rotational position to the second rotational position causes the claw actuating portion to rotate the claw from the abutting position to the non-abutting position, and a rotation of the opening lever from the second rotational position to the third rotational position causes the fork restricting portion to cease to restrict the rotation of the fork toward the open position, while causing the claw actuating portion to restrict rotation of the claw toward the abutting position.

When the door is to be opened, the fork restricting portion of the opening lever restricts the rotation of the fork toward the open position, and the claw actuating portion of the opening lever then rotates the claw from the abutting position to the non-abutting position. After that, the fork restricting portion ceases to restrict the rotation of the fork toward the open position, with the claw actuating portion restricting the rotation of the claw toward the abutting position. Through this operation, the fork is allowed to move from the latching position to the open position, so that the door can be automatically opened reliably.

The opening lever having the fork restricting portion and the claw actuating portion is pivotally supported on the other side of the insertion groove, the other side being on the same side where the claw is, and is disposed spaced apart from the claw in the axial direction of the claw shaft. Therefore, it is not necessary to ensure a space for placing the opening lever on the same plane as the claw. In other words, by positioning the opening lever three-dimensionally with respect to the fork and the claw, it is possible to reduce a projection area occupied by a projection of the fork, the claw, and the opening lever onto the base, in a view from the direction in which the claw shaft extends. Therefore, the door latch device can be reduced in size.

According to the present invention, it is possible to reduce the size of a door latch device capable of automatically opening a door.

DETAILED DESCRIPTION

An embodiment of the present invention will now be explained with reference to some drawings.

Figure 1:
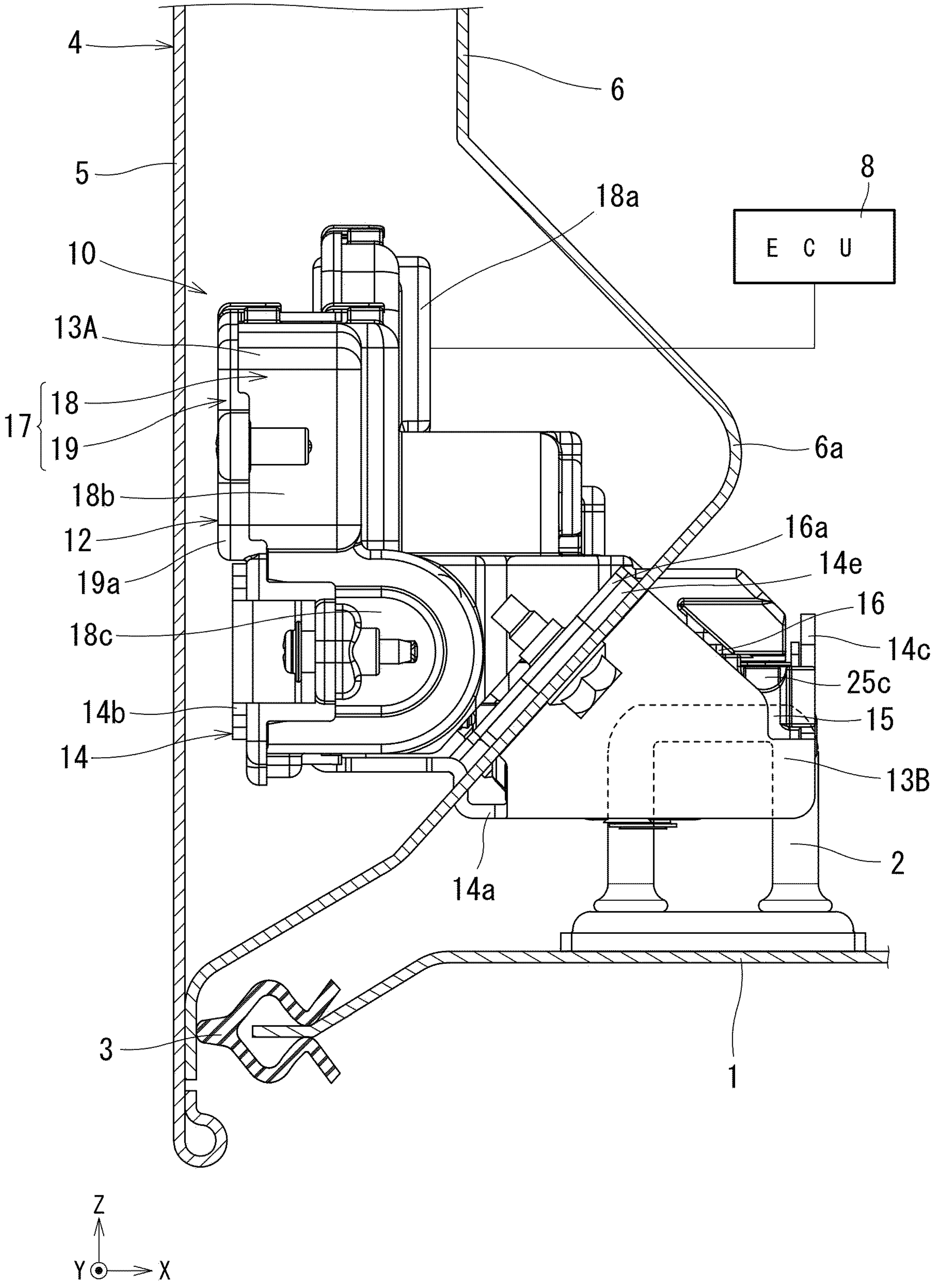
FIG. 1 is a side view of a door latch device according to an embodiment of the present invention disposed in a back door.

Referring to FIG. 1, a door latch device 10 according to an embodiment of the present invention is disposed in a back door 4 that opens and closes a rear opening on a vehicle body 1, and holds the back door 4 closed, openably with respect to the vehicle body 1.

The X direction in the accompanying drawings corresponds to the vehicle length direction. The side to which the arrow is pointing is a front side (vehicle interior side), and the direction opposite to the side the arrow is pointing is a rear side (vehicle exterior side). The Y direction corresponds the vehicle width direction, and the Z direction corresponds to the vehicle height direction. In the following description, the configuration in which the back door 4 is closed with respect to the vehicle body 1 will be used as a reference.

On the vehicle body 1, an inverted U-shaped striker 2 to be held by the door latch device 10 is fixed with screws. A weather strip 3 made of rubber that seals a gap between the back door 4 and the vehicle body 1 is disposed at a rear end of the vehicle body 1 in the vehicle length direction.

The back door 4 includes an outer panel 5 exposed to the exterior of the vehicle, and an inner panel 6 disposed on the front side (vehicle interior side) of the outer panel 5 in the vehicle length direction. On a lower part of the inner panel 6, a bulging portion 6*a* bulging toward the interior side of the vehicle is provided. The inner panel 6 is joined to the outer panel 5, on the side lower than the bulging portion 6*a*. The back door 4 is configured to be opened and closed in the vehicle height direction, and has an upper end thereof rotatably mounted to a rotation shaft that is installed in the vehicle body 1 and that extends in the vehicle width direction. However, the back door 4 may be rotatably mounted to a rotation shaft extending in the vehicle height direction, and opened and closed in the vehicle width direction.

Overview of Door Latch Device

Figure 2:
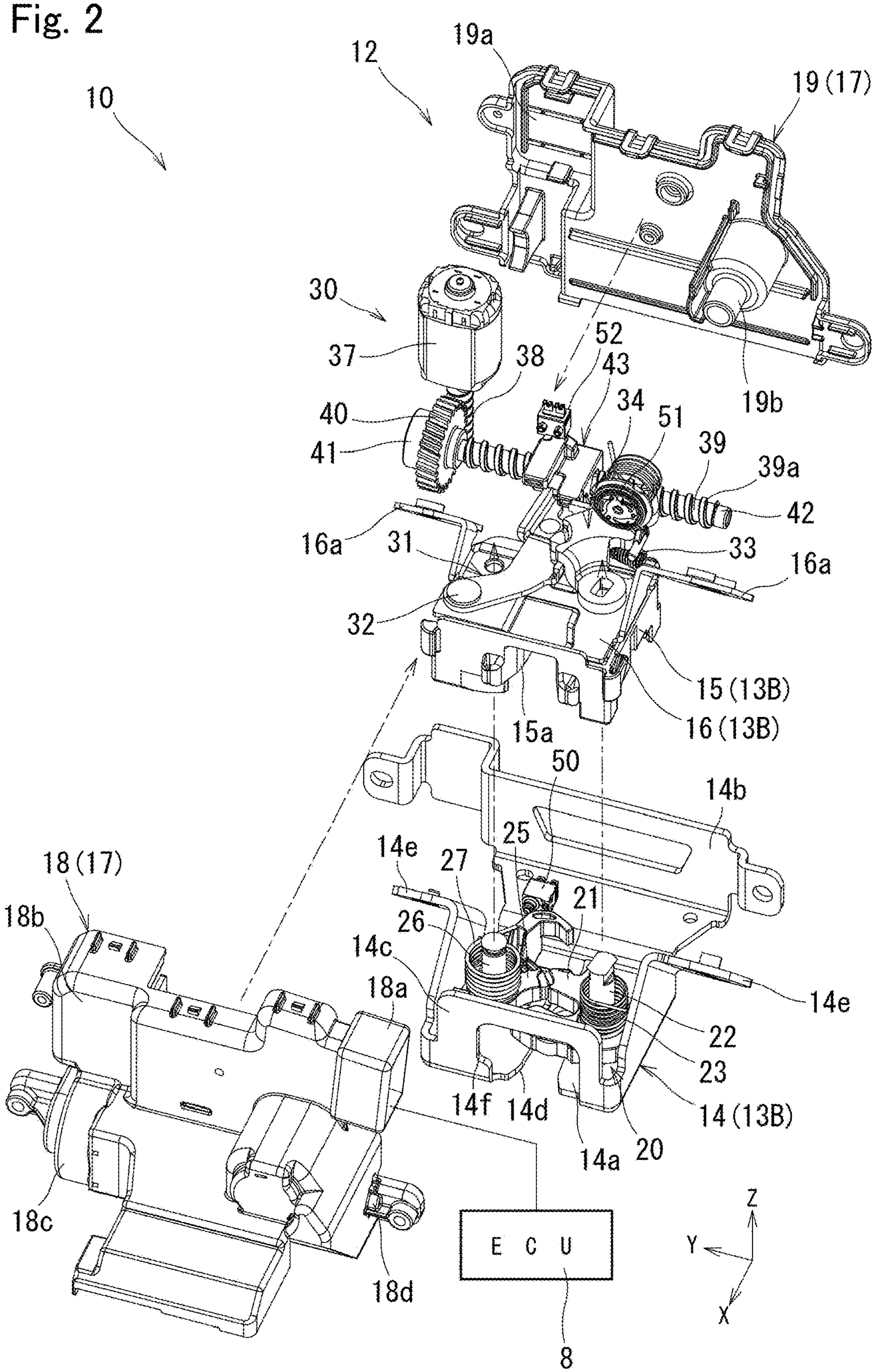
FIG. 2 is an exploded perspective view of the door latch device.
Figure 3:
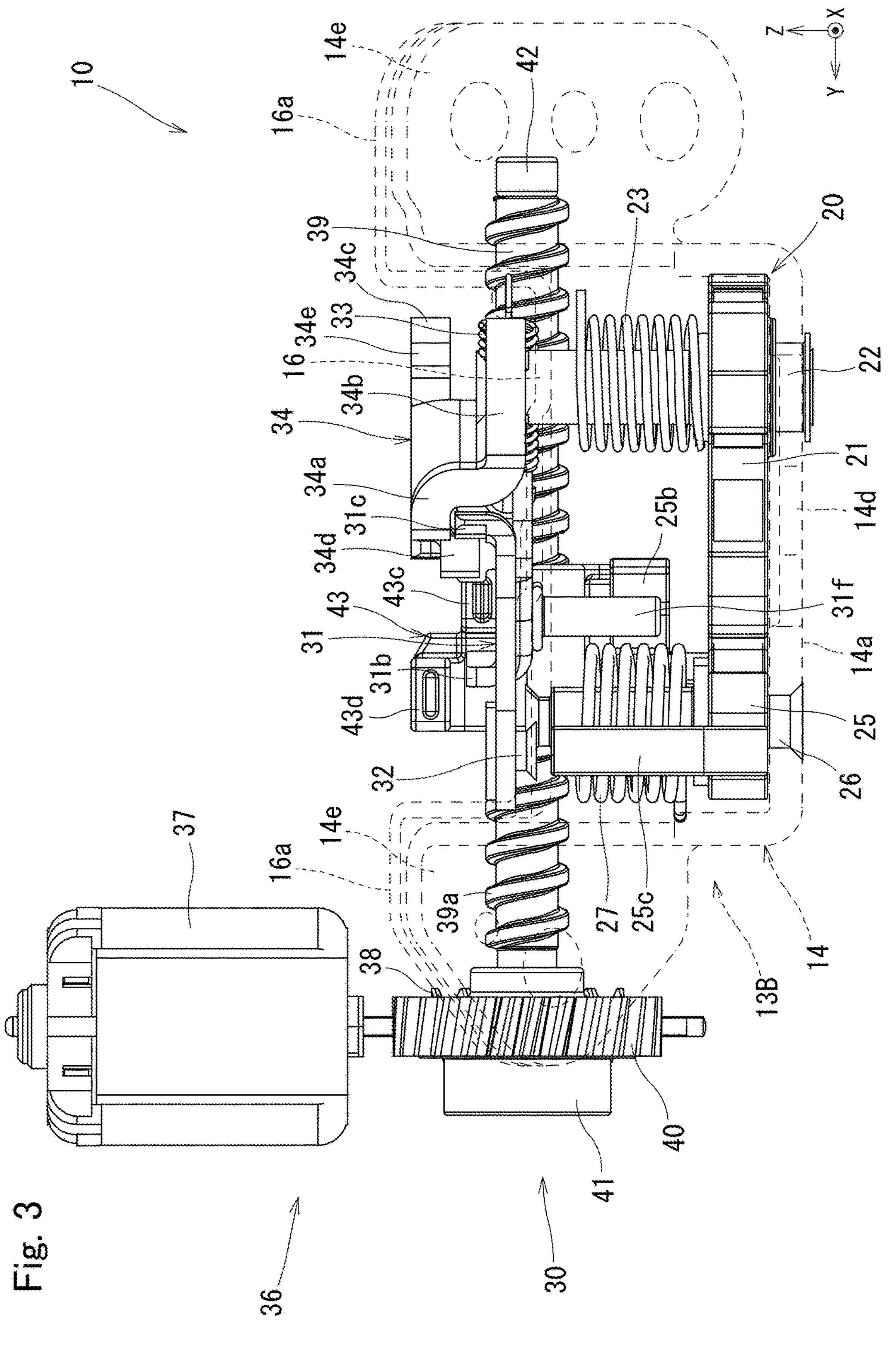
FIG. 3 is a front view of a latch mechanism and an electric opening/closing mechanism.

Referring to FIGS. 1 and 2, the door latch device 10 includes a latch mechanism 20 and an electric opening/closing mechanism 30 provided inside a housing 12.

The housing 12 has a substantially L shape in a view from the vehicle width direction, and is fixed to the inner panel 6 with bolts. A main body 13A, which constitutes a major part of the housing 12, is fitted between the outer panel 5 and the bulging portion 6*a* of the inner panel 6. A base 13B constituting the remaining part of the housing 12 penetrates through the bulging portion 6*a*, and protrude out to the interior side of the vehicle.

With reference to FIGS. 2 to 5, the latch mechanism 20 includes a fork 21 and a claw 25, and is disposed inside the base 13B of the housing 12 illustrated in FIG. 1. The electric opening/closing mechanism 30 switches the latch mechanism 20 between a latching state illustrated in FIG. 13 and an open state illustrated in FIG. 20. The latch mechanism 20 in the latching state illustrated in FIG. 13 holds the striker 2 to keep the back door 4 closed, with respect to the vehicle body 1 illustrated in FIG. 1. The latch mechanism 20 in the open state illustrated in FIG. 20 allows the striker 2 to be released, so that the back door 4 can be opened with respect to the vehicle body 1 illustrated in FIG. 1. In a half-latching state illustrated in FIG. 21, which is between the latching state illustrated in FIG. 13 and the open state illustrated in FIG. 20, the latch mechanism 20 holding the striker 2 holds the back door 4 illustrated in FIG. 1.

The electric opening/closing mechanism 30 includes an opening lever 31, a fork lever 34, and a driving mechanism 36. The driving mechanism 36 includes a motor 37, a spindle 39, and a slider 43. The opening lever 31 and the fork lever 34 are disposed in the base 13B of the housing 12. The driving mechanism 36 is disposed inside the main body 13A of the housing 12. The motor 37 is connected to an electronic control unit (ECU) 8 illustrated in FIGS. 1 and 2.

Figure 13:
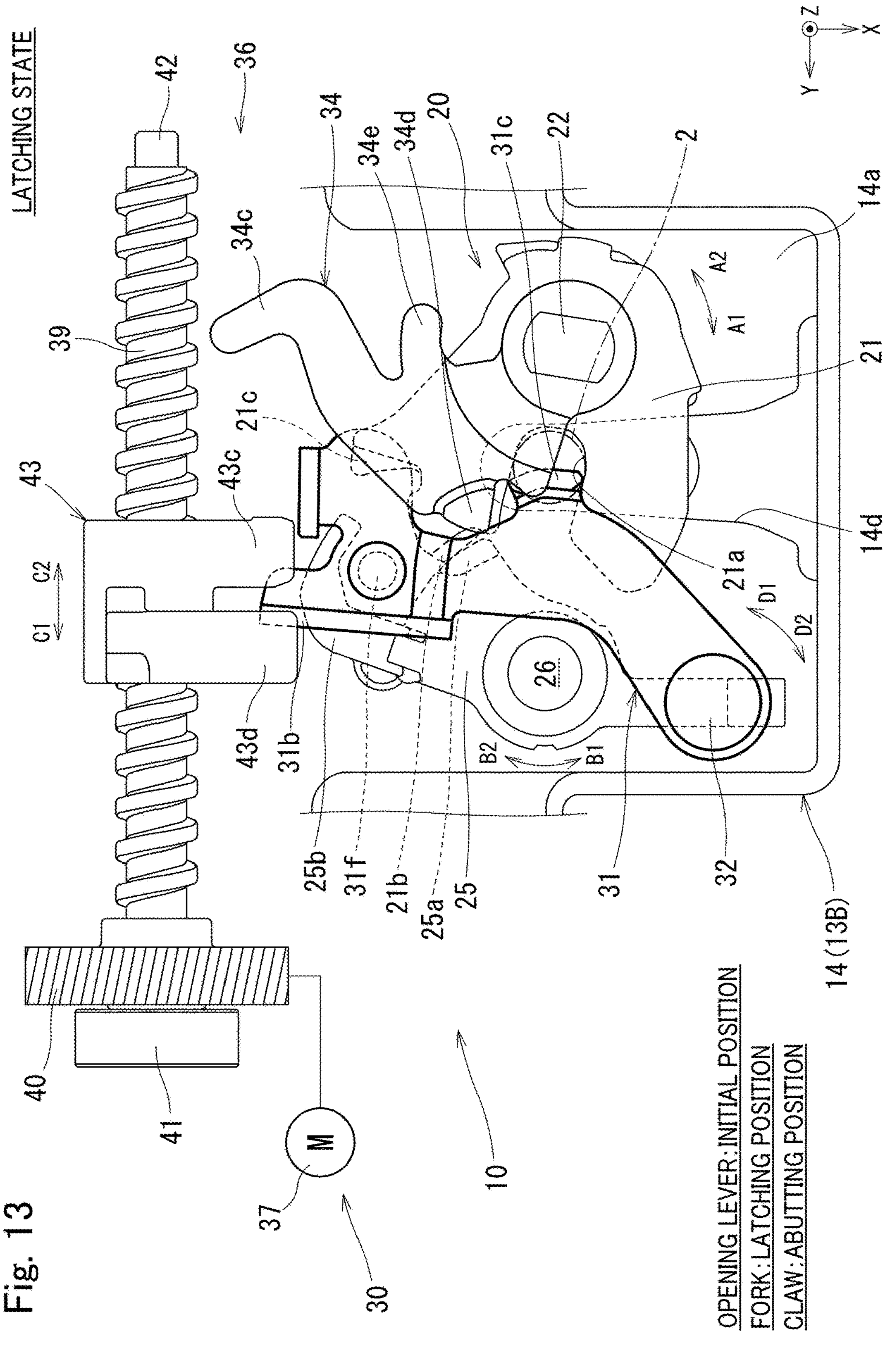
FIG. 13 is a plan view in a latching state illustrated in FIG. 11.
Figure 20:
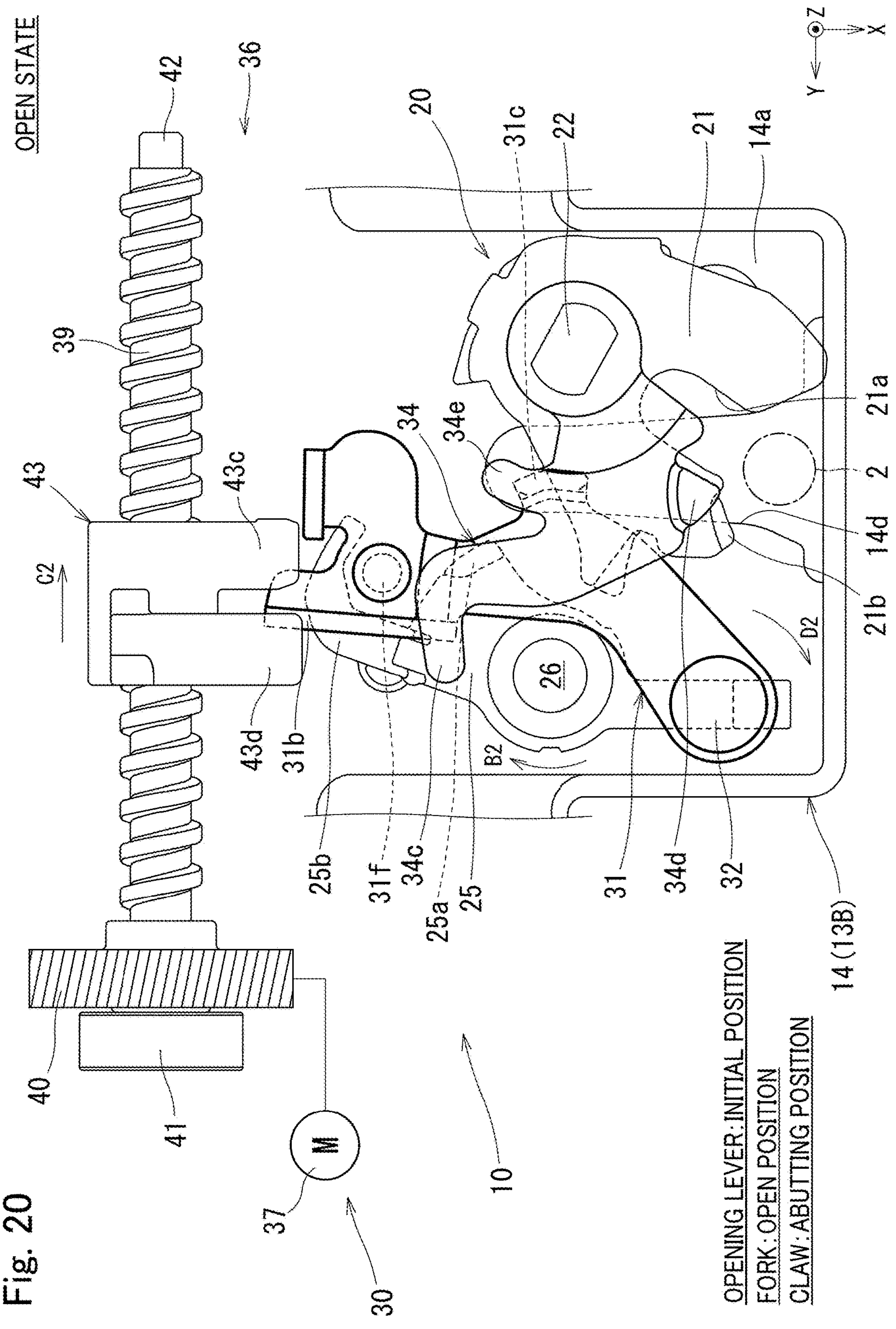
FIG. 20 is a plan view of the open state illustrated in FIG. 11.

For example, when an open switch (not illustrated) disposed on the back door 4 illustrated in FIG. 1 is operated, the ECU 8 switches the latch mechanism 20 from the latching state illustrated in FIG. 13 to the open state illustrated in FIG. 20, by causing the electric opening/closing mechanism 30 to perform an opening operation. When the back door 4 that is open is to be closed, and the latch mechanism 20 shifts from the open state illustrated in FIG. 20 to the half-latching state illustrated in FIG. 21, the ECU 8 switches the latch mechanism 20 to the latching state illustrated in FIG. 13, by causing the electric opening/closing mechanism 30 to perform a closing operation.

In the present embodiment, the fork 21 and the claw 25 included in the latch mechanism 20 are disposed in a manner spaced apart from the opening lever 31 and the fork lever 34 of the electric opening/closing mechanism 30 in the vehicle height direction, with respect to the base 13B. In this manner, a smaller XY area (projection area) is required on the base 13B, in a view from the vehicle height direction, so that the entire door latch device 10 is reduced in size.

The housing 12, the latch mechanism 20, and the electric opening/closing mechanism 30 will now be described specifically.

Configuration of Housing

Referring to FIGS. 1 and 2, the housing 12 includes the main body 13A having an L shape, in a view in the vehicle width direction, and disposed inside the back door 4, and the base 13B protruding from a lower end of the main body 13A toward the front side in the vehicle length direction, to the outside of the back door 4. The housing 12 includes a base plate 14, a fence block 15, a cover plate 16, and a cover 17.

The base plate 14 is made of a pressed metal plate, and includes a base body 14*a*, a reinforcement plate 14*b*, and a cover piece 14*c*. Among these elements, a rear portion of the base body 14*a* in the vehicle length direction and the reinforcement plate 14*b* together form a part of the main body 13A. A front portion of the base body 14*a* in the vehicle length direction and the cover piece 14*c* together form a part of the base 13B.

The base body 14*a* extends substantially on the XY plane along the vehicle body 1. A front portion of the base body 14*a* in the vehicle length direction penetrates through the bulging portion 6*a* of the inner panel 6, and is on the interior side of the vehicle. The base body 14*a* has an insertion groove 14*d* into which the striker 2 can be inserted, the insertion groove 14*d* extending rearwards from the front end in the vehicle length direction, substantially at the center in the vehicle width direction. Brackets 14*e* via which the bolts are fixed to the inner panel 6 are provided on both sides of the base body 14*a* in the vehicle width direction.

The reinforcement plate 14*b* protrudes upwards from the rear end of the base body 14*a* in the vehicle length direction, and extends along the YZ plane along the outer panel 5.

The cover piece 14*c* protrudes upwards from the front end of the base body 14*a* in the vehicle length direction, and extends along the YZ plane. The cover piece 14*c* has an opening 14*f* for allowing the striker 2 to be inserted into the insertion groove 14*d*.

The fence block 15 is made of resin, is interposed between the base body 14*a* of the base plate 14 and the cover plate 16, and forms a part of the base 13B. The fence block 15 has an insertion groove 15*a* extending in the vehicle length direction, in a manner corresponding to the insertion groove 14*d* of the base body 14*a*.

The cover plate 16 is made of a pressed metal plate, is disposed on top of the fence block 15, and forms a part of the base 13B. Provided on both sides of the cover plate 16 in the vehicle width direction are brackets 16*a* that are placed in a manner overlapping with the respective brackets 14*e* of the base plate 14, and are assembled to the back door 4. The total length of the cover plate 16 in the vehicle length direction is shorter than the total length of the base body 14*a* in the vehicle length direction. With this, a space for placing the driving mechanism 36 is ensured between the rear end of the cover plate 16 in the vehicle length direction and the reinforcement plate 14*b* of the base plate 14.

The front portion of the base plate 14, the fence block 15, and the cover plate 16 together form the base 13B of the housing 12. The fork 21 and the claw 25 of the latch mechanism 20 are disposed on the same plane, on the bottom of the base 13B, that is, on the base body 14*a* of the base plate 14. The opening lever 31 and the fork lever 34 included in the electric opening/closing mechanism 30 are disposed on the same plane, on top of the base 13B, that is, on the cover plate 16. As described above, by positioning the opening lever 31 and the fork lever 34 three-dimensionally with respect to the fork 21 and the claw 25, the projection area required for positioning these elements on the base 13B is reduced, in a view from the vehicle height direction.

The cover 17 is provided to ensure the alignment of the motor 37, the spindle 39, and the slider 43 of the driving mechanism 36, and to cover the opening lever 31 and the fork lever 34 of the driving mechanism 36, and the fork 21 and the claw 25 of the latch mechanism 20. The cover 17 includes a cover main body 18 and a rear cover 19.

The cover main body 18 covers a section from the front end of the cover plate 16 in the vehicle length direction to above the reinforcement plate 14*b* of the base plate 14. The cover main body 18 includes a connector 18*a*, a motor enclosure 18*b*, a gear enclosure 18*c*, and a spindle support 18*d*. The connector 18*a* is provided to the upper right end of the cover main body 18 in the vehicle width direction in FIG. 2, and connects the door latch device 10 to the ECU 8. The motor enclosure 18*b* is provided to the upper left end of the cover main body 18 in the vehicle width direction in FIG. 2, and houses the motor 37 of the driving mechanism 36. The gear enclosure 18*c* is provided below the motor enclosure 18*b*, houses a worm 38 and a worm wheel 40 of the driving mechanism 36, and rotatably supports one end of the spindle 39. The spindle support 18*d* is provided below the connector 18*a*, and supports the other end of the spindle 39.

The rear cover 19 is assembled to the rear side of the cover main body 18 in the vehicle length direction, and covers the rear opening of the cover main body 18. The rear cover 19 is disposed adjacently to the slider 43 of the driving mechanism 36, and restricts the rotation of the slider 43 about the spindle 39, by allowing the slider 43 to but against the rear cover 19. The rear cover 19 includes a cover portion 19*a* that covers the motor 37, the worm 38, and the worm wheel 40 of the driving mechanism 36, and a switch attachment 19*b* for attaching a rotary switch 51, which will be described later in detail.

Configuration of Latch Mechanism

Figure 4:
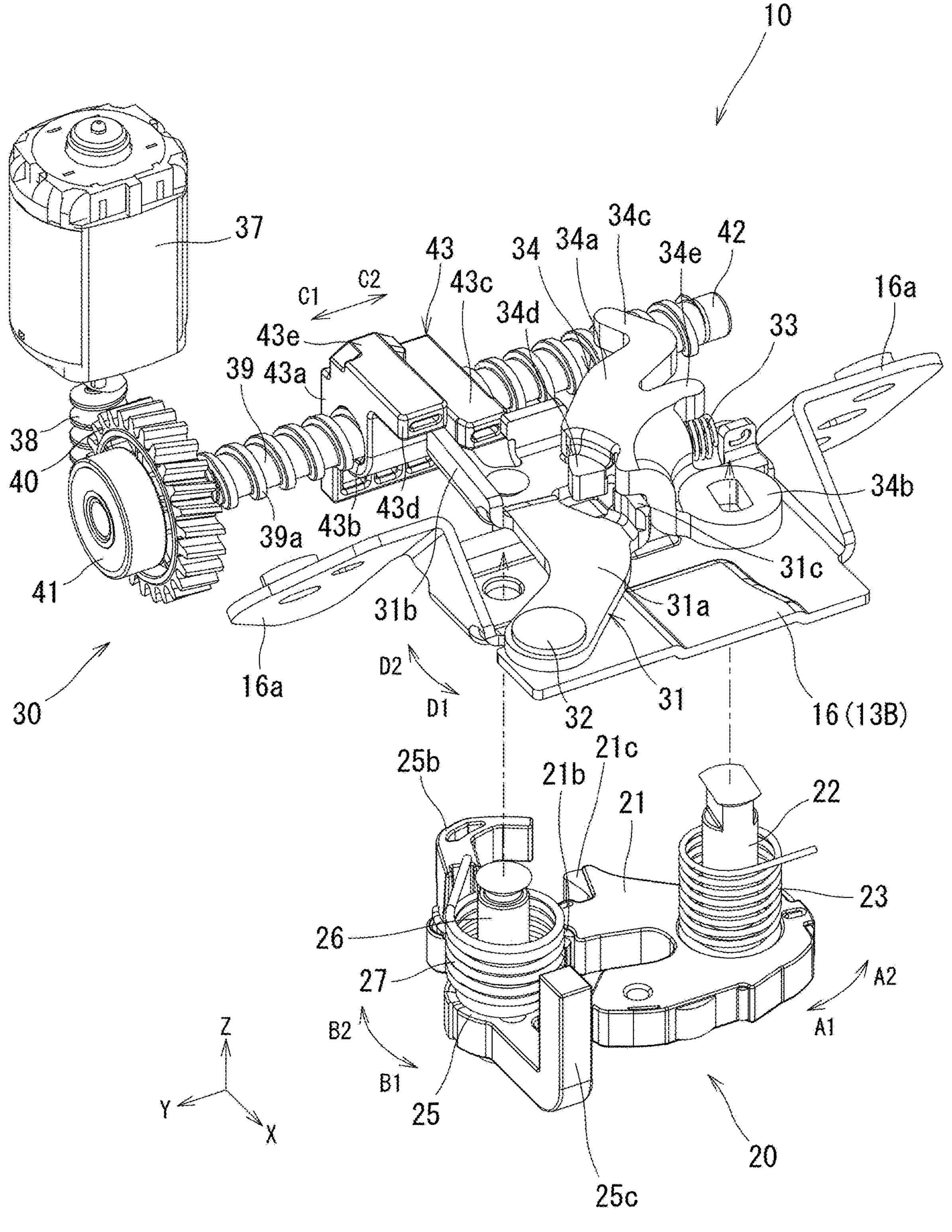
FIG. 4 is a perspective view of the latch mechanism and the electric opening/closing mechanism in a view from an upper front side.
Figure 5:
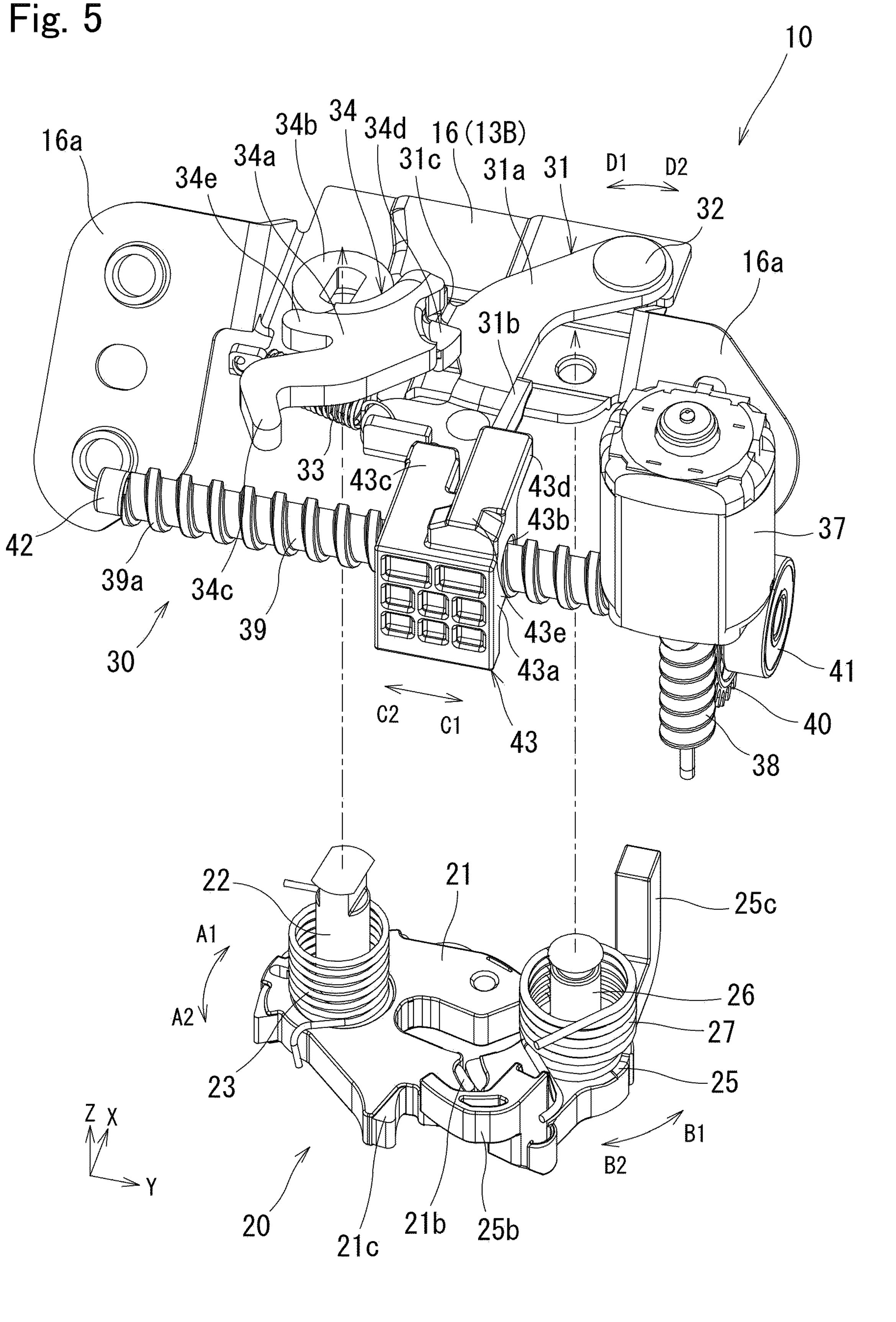
FIG. 5 is a perspective view of the latch mechanism and the electric opening/closing mechanism in a view from an upper rear side.
Figure 6:
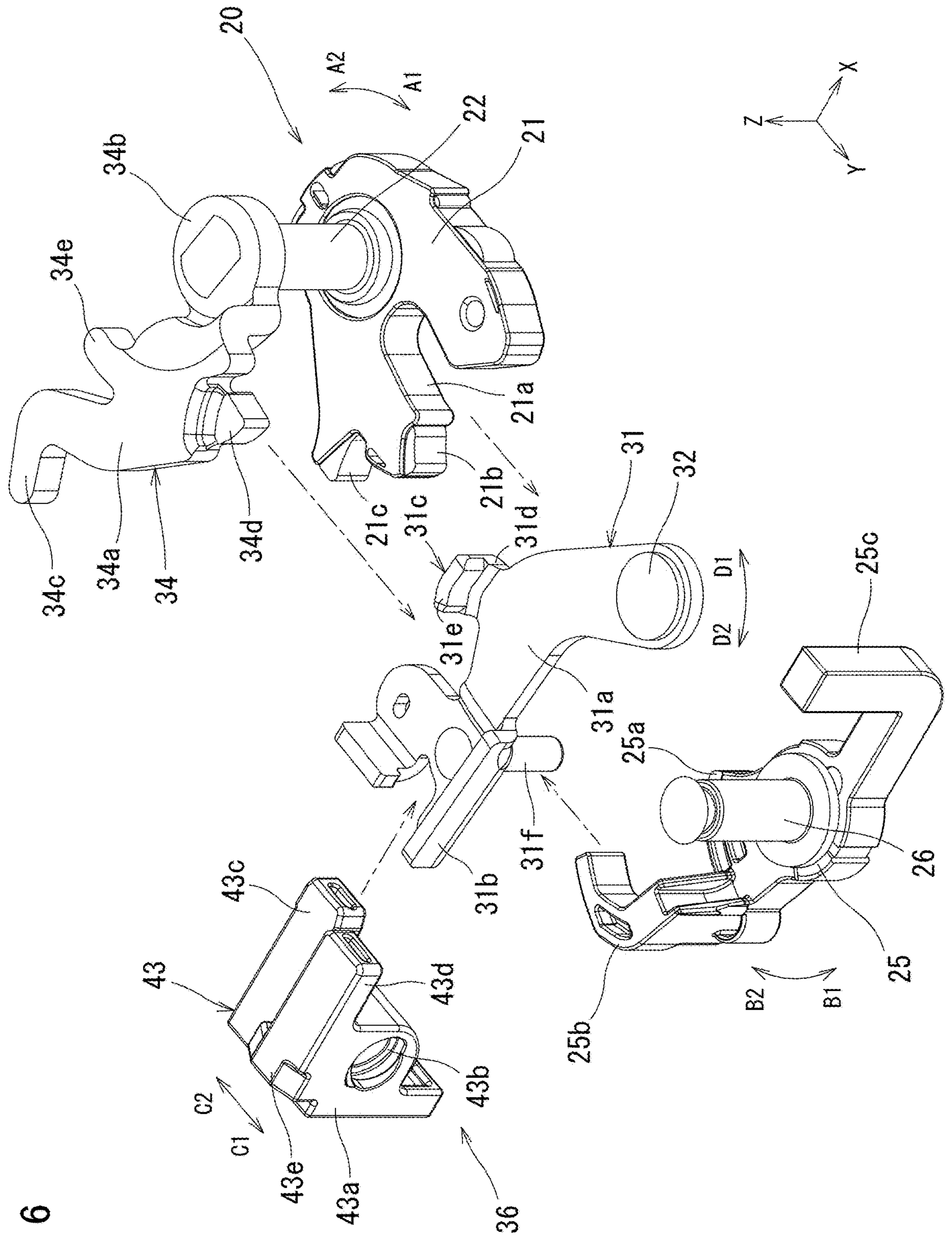
FIG. 6 is an exploded perspective view of the latch mechanism and the electric opening/closing mechanism.

Referring to FIGS. 4 to 6, the latch mechanism 20 includes the fork 21 that releasably holds the striker 2 illustrated in FIG. 1, and the claw 25 that comes into abutment against the fork 21 releasably. The fork 21 and the claw 25 are disposed on the base body 14*a* of the base plate 14, and are positioned on the front side of the motor 37, the spindle 39, and the slider 43 of the driving mechanism 36, in the vehicle length direction.

The fork 21 is mounted on a fork shaft 22, and is integrally rotatable with the fork shaft 22. The fork shaft 22 is disposed in a manner extending along the vehicle height direction, on one side (the right side in FIG. 13) of the base plate 14 in the vehicle width direction that is orthogonal to the insertion groove 14*d* extending in the vehicle length direction, that is, on one side of the insertion groove 14*d*.

The lower end of the fork shaft 22 penetrates through the base body 14*a* of the base plate 14, and is rotatably supported by the base plate 14. The upper end of the fork shaft 22 penetrates through the cover plate 16, and is rotatably supported by the cover plate 16.

Figure 16:
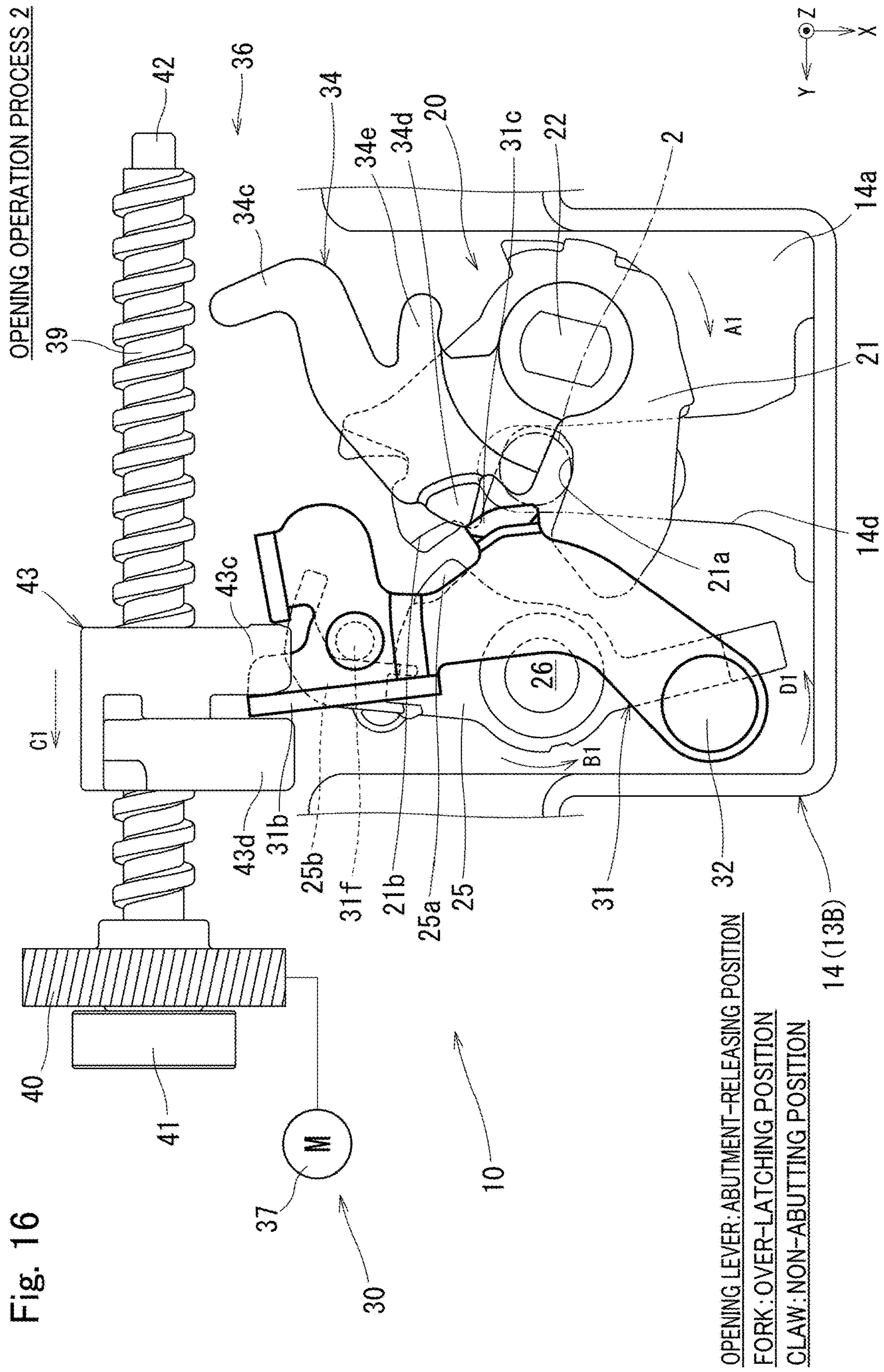
FIG. 16 is a plan view of an opening operation process 2 illustrated in FIG. 11.
Figure 21:
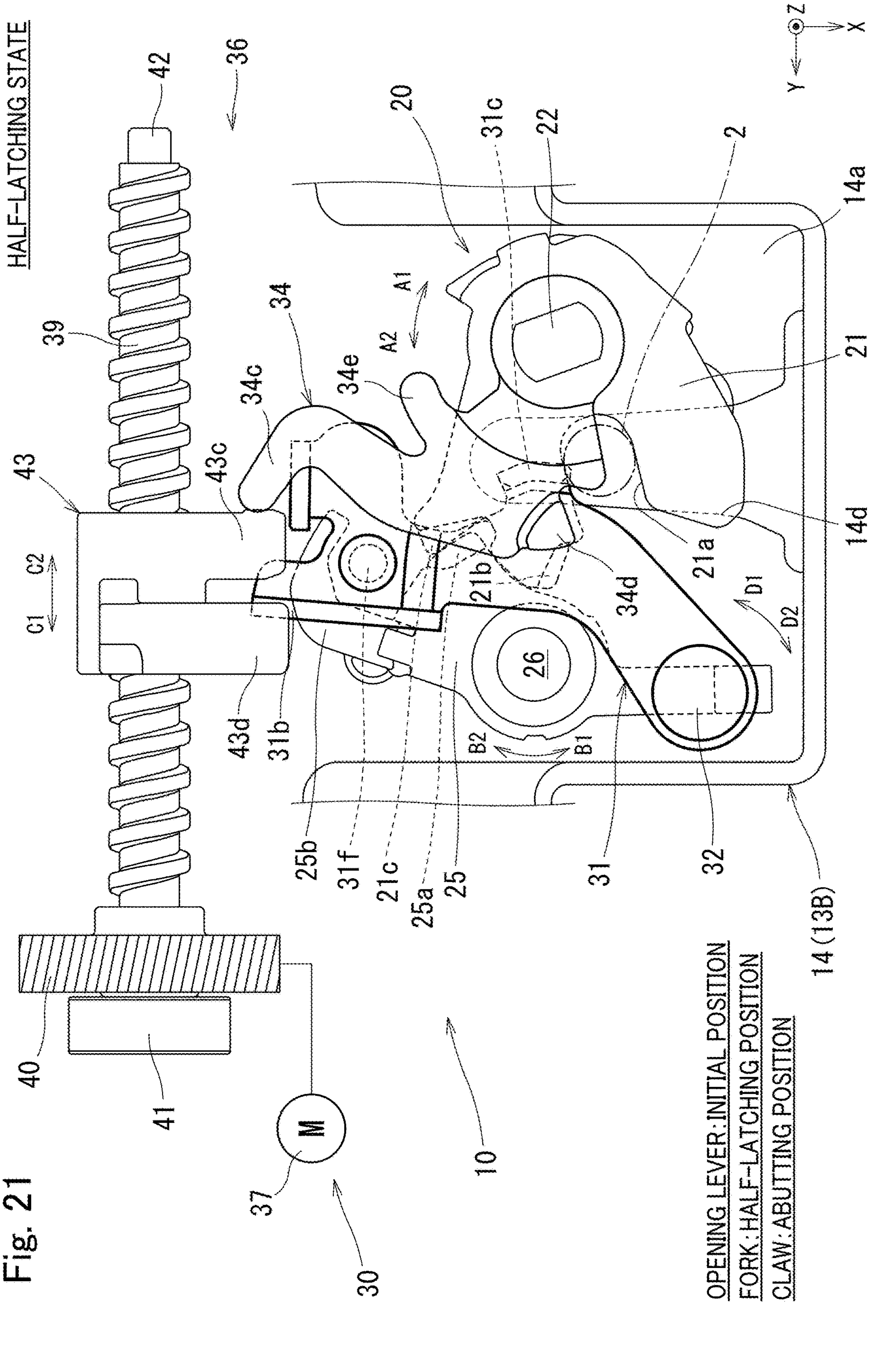
FIG. 21 is a plan view illustrating the latch mechanism and the electric opening/closing mechanism at the time when a door closing operation is started.

The fork 21 having such a configuration is integrally rotatable with the fork shaft 22 in a direction A1 (clockwise direction) from an open position illustrated in FIG. 20, through a half-latching position illustrated in FIG. 21 and a latching position illustrated in FIG. 13, to the over-latching position illustrated in FIG. 16, in the order listed herein. The fork 21 is also integrally rotatable with the fork shaft 22 in a direction A2 (counterclockwise direction) from the over-latching position illustrated in FIG. 16, through the latching position illustrated in FIG. 13 and the half-latching position illustrated in FIG. 21, to the open position illustrated in FIG. 20, in the order listed herein. The half-latching position illustrated in FIG. 21 is spaced apart from the open position illustrated in FIG. 20 in the direction A1. The latching position illustrated in FIG. 13 is at a rotation angle further away from the open position illustrated in FIG. 20, than the half-latching position illustrated in FIG. 21. The over-latching position illustrated in FIG. 16 is at a rotational angle further away from the open position illustrated in FIG. 20, than the latching position illustrated in FIG. 13.

The fork 21 is biased from the over-latching position illustrated in FIG. 16 toward the open position illustrated in FIG. 20, in the direction A2, by a kick spring (biasing member) 23. One end of the kick spring 23 is engaged with the fork 21, and the other end of the kick spring 23 is engaged with the fence block 15. The rotation of the fork 21 beyond the open position illustrated in FIG. 20 toward the direction A2 is restricted by a stopper (not illustrated).

The fork 21 has a holding groove 21*a* extending from its outer periphery toward the fork shaft 22. When the fork 21 is rotated to the open position illustrated in FIG. 20, the holding groove 21*a* is brought to the orientation where an opening provided to an end of the holding groove 21*a* is positioned above the insertion groove 14*d* of the base plate 14, so that the striker 2 can be released therefrom. When the fork 21 is rotated to any one of the latching position illustrated in FIG. 13, the half-latching position illustrated in FIG. 21, and the over-latching position illustrated in FIG. 16, the holding groove 21*a* is brought to the orientation intersecting with the insertion groove 14*d*, and holds the striker 2 non-releasably.

Referring to FIGS. 4 to 6, on the outer periphery of the fork 21, a full-latch abutment 21*b* and a half-latch abutment 21*c* against which the claw 25 can come into abutment are provided. The full-latch abutment 21*b* is provided to a tip of a groove wall defining the holding groove 21*a*, on the side of the direction A1. The half-latch abutment 21*c* is provided spaced apart from the full-latch abutment 21*b* in the direction A1.

Referring to FIGS. 2 and 13, the claw 25 is rotatably supported by a claw shaft 26. The claw shaft 26 is disposed on the base plate 14, on the other side of the insertion groove 14*d* in the vehicle width direction (the left side in FIG. 13), the other side being on the opposite side of the fork 21, and extends in the vehicle height direction along the fork shaft 22. The lower end of the claw shaft 26 penetrates through the base body 14*a* of the base plate 14, and crimped. The upper end of the claw shaft 26 penetrates through the cover plate 16, and crimped. In a view in the vehicle height direction, the claw shaft 26 is disposed on the rear side of the fork shaft 22 in the vehicle length direction, that is, on the side of the spindle 39 of the driving mechanism 36. However, the claw shaft 26 may be disposed at the same position as the fork shaft 22 in the vehicle length direction. In other words, the distance from the spindle 39 to the claw shaft 26 in the vehicle length direction may be equal to or less than the distance from the spindle 39 to the fork shaft 22 in the vehicle length direction.

Figure 19:
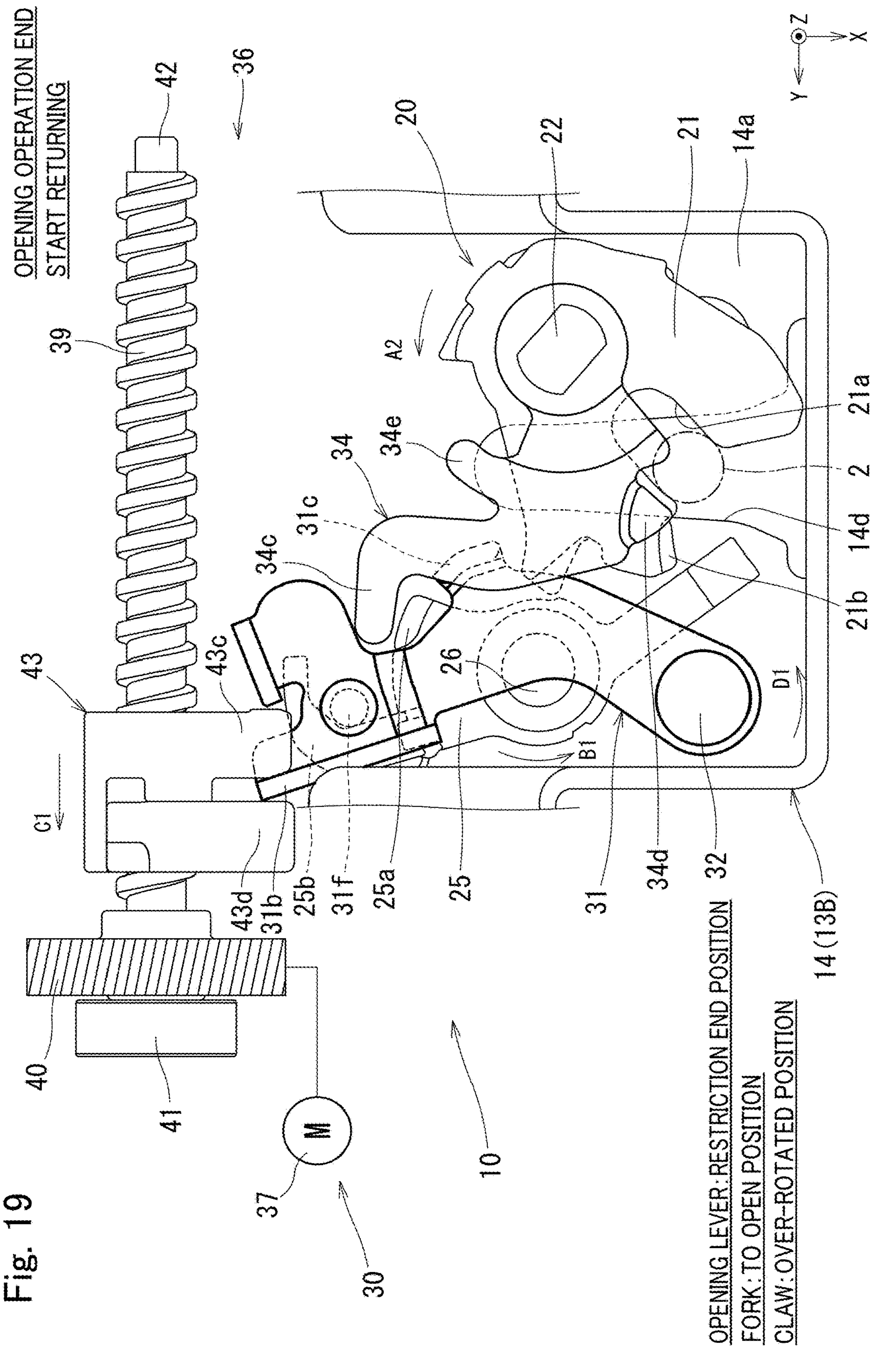
FIG. 19 is a plan view at the time when the opening operation is ended in FIG. 11.

The claw 25 thus pivotally supported is rotatable about the claw shaft/26 from the abutting position illustrated in FIG. 13, through a non-abutting position illustrated in FIG. 16, and to the over-rotated position illustrated in FIG. 19 in a direction B1 (counterclockwise direction). The claw 25 is also rotatable about the claw shaft 26 in a direction B2 (clockwise direction) from the over-rotated position illustrated in FIG. 19, through the non-abutting position illustrated in FIG. 16, and to the abutting position illustrated in FIG. 13. The non-abutting position illustrated in FIG. 16 is spaced apart from the abutting position illustrated in FIG. 13 in the direction B1. The over-rotated position illustrated in FIG. 19 is at a rotation angle further away from the abutting position illustrated in FIG. 13, than the non-abutting position illustrated in FIG. 16.

The claw 25 is biased in the direction B2 from the over-rotated position illustrated in FIG. 19 toward the abutting position illustrated in FIG. 13, by a kick spring (biasing member) 27. One end of the kick spring 27 is engaged with the claw 25, and the other end of the kick spring 27 is engaged with the fence block 15. The rotation of the claw 25 beyond the abutting position illustrated in FIG. 13 toward the direction B2 is restricted by a stopper (not illustrated).

Referring to FIGS. 4 to 6, the claw 25 includes an abutment 25*a* that can be brought into abutment against the full-latch abutment 21*b* and the half-latch abutment 21*c* of the fork 21. When the claw 25 is rotated to the abutting position, the abutment 25*a* either abuts against the full-latch abutment 21*b* of the fork 21 having rotated to the latching position illustrated in FIG. 13, or abuts against the half-latch abutment 21*c* of the fork 21 having rotated to the half-latching position illustrated in FIG. 21. In this manner, the claw 25 restricts rotation of the fork 21 toward the open position illustrated in FIG. 20, against the biasing force of kick spring 23. When the claw 25 is rotated from the non-abutting position illustrated in FIG. 16 to the over-rotated position illustrated in FIG. 19, the abutment 25*a* cannot abut against the full-latch abutment 21*b* nor against the half-latch abutment 21*c*. In this manner, the claw 25 permits the fork 21 to be rotated by the biasing force of the kick spring 23.

The claw 25 includes an opening operation receiving portion 25*b* on which an opening operation of the opening lever 31, included in of the electric opening/closing mechanism 30, is exerted. The opening operation receiving portion 25*b* in the present embodiment includes a first portion protruding upwards from the claw 25 and a second portion protruding from rearwards from an upper end of the first portion in the vehicle length direction. The second portion has a J shape in a view from the vehicle height direction, and is curved toward the fork 21. When the opening operation receiving portion 25*b* receives the opening operation of the opening lever 31 from the side facing the fork 21, the claw 25 is rotated from the abutting position illustrated in FIG. 13 toward the non-abutting position illustrated in FIG. 16, against the biasing force of the kick spring 27 (see FIG. 9).

The claw 25 also includes an emergency opening actuating portion 25*c* for opening the back door 4 illustrated in FIG. 1 in a situation where the electric opening/closing mechanism 30 becomes incapable of performing the opening operation due to causes such as shortage in the battery voltage. The emergency opening actuating portion 25*c* has an L shape in a view in the vehicle width direction, and includes a first portion protruding forwards in the vehicle length direction and a second portion protruding upwards from the front end of the first portion. Referring to FIG. 1, the upper end of the second portion of the emergency opening actuating portion 25*c* is exposed to the outside through the opening of the base 13B protruding to the interior side of the vehicle. By pressing the upper end of the emergency opening actuating portion 25*c* in the vehicle width direction from the outside of the base 13B, the claw 25 is caused to rotate toward the non-abutting position illustrated in FIG. 16, against the biasing force of the kick spring 27.

Referring to FIG. 2, a switch 50 for detecting the position of the rotated claw 25 is provided on the rear side of the opening operation receiving portion 25*b* of the claw 25, in the vehicle length direction. The switch 50 is attached to the cover main body 18, and is operated by the opening operation receiving portion 25*b* when the claw 25 is rotated to the abutting position illustrated in FIG. 13. As the switch 50, it is possible to use a push switch configured to output a signal while the push switch is being operated by the opening operation receiving portion 25*b*, and not to output a signal with no operation of the opening operation receiving portion 25*b*. The ECU 8 can determine whether the claw 25 is rotated to the abutting position illustrated in FIG. 13, on the basis of an input signal from the switch 50.

Configuration of Electric Opening and Closing Mechanism

Referring to FIGS. 3 to 6, the electric opening/closing mechanism 30 includes an opening lever 31, a fork lever 34, and a driving mechanism 36. The driving mechanism 36 includes a motor 37, a spindle 39, and a slider 43.

Figure 9:
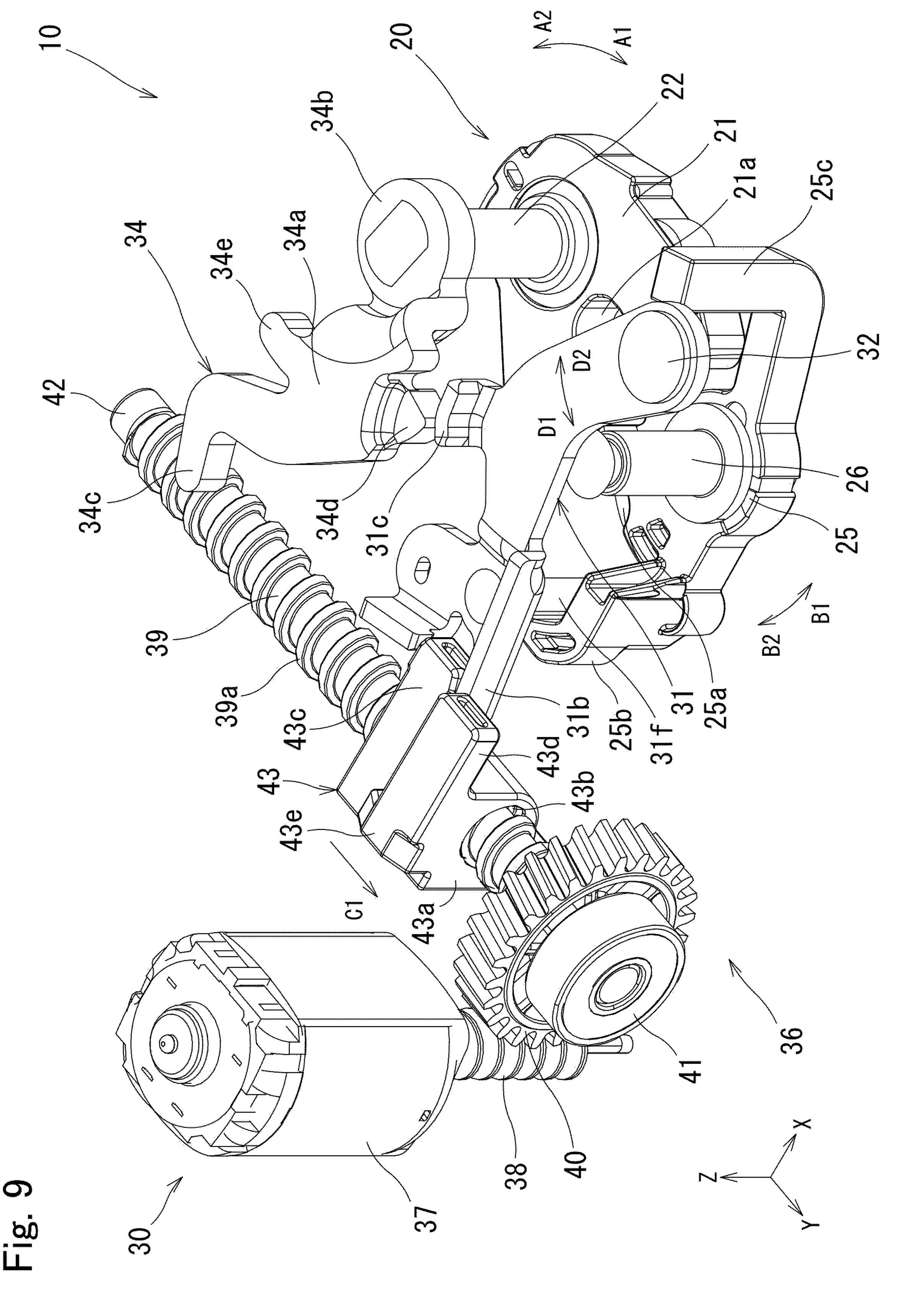
FIG. 9 is a perspective view illustrating a process of operations of the latch mechanism and the electric opening/closing mechanism when the door is opened.

By causing the motor 37 to rotate the spindle 39 forwardly, the slider 43 is moved in a direction C1 in the vehicle width direction along the spindle 39, and the slider 43 causes the opening lever 31 to make an opening operation (see FIG. 9). With this, the opening lever 31 causes the claw 25 to rotate from the abutting position illustrated in FIG. 13, through the non-abutting position illustrated in FIG. 19, to the over-rotated position illustrated in FIG. 16, while restricting the rotation of the fork 21 via the fork lever 34. As a result, the latch mechanism 20 is switched to the open state illustrated in FIG. 20. Furthermore, by causing the motor 37 to rotate the spindle 39 reversely, the slider 43 is moved in a direction C2 in the vehicle width direction along the spindle 39, and the slider 43 causes the fork lever 34 to make a closing operation (see FIG. 10). As a result, the latch mechanism 20 is switched from the half-latching state illustrated in FIG. 21 to the latching state illustrated in FIG. 13.

Referring to FIGS. 4 to 6, the opening lever 31 is made of a pressed metal plate, and is rotatably supported by a shaft member 32. The shaft member 32 is mounted on the cover plate 16, on the other side of the insertion groove 14*d* on the base plate 14 in the vehicle width direction (the left side in FIG. 13), the other side being on the same side as the claw 25. The axial direction of the shaft member 32 extends in the vehicle height direction, along the fork shaft 22 and the claw shaft 26. In a view in the vehicle height direction, the shaft member 32 is disposed on the front side of the claw shaft 26 and the fork shaft 22 in the vehicle length direction, that is, disposed on the side of an opening end of the insertion groove 14*d* of the base plate 14, with respect to the claw shaft 26. However, the opening lever 31 may also be pivotally supported by the same claw shaft 26 as the claw 25, without using the shaft member 32 dedicated thereto.

Figure 14:
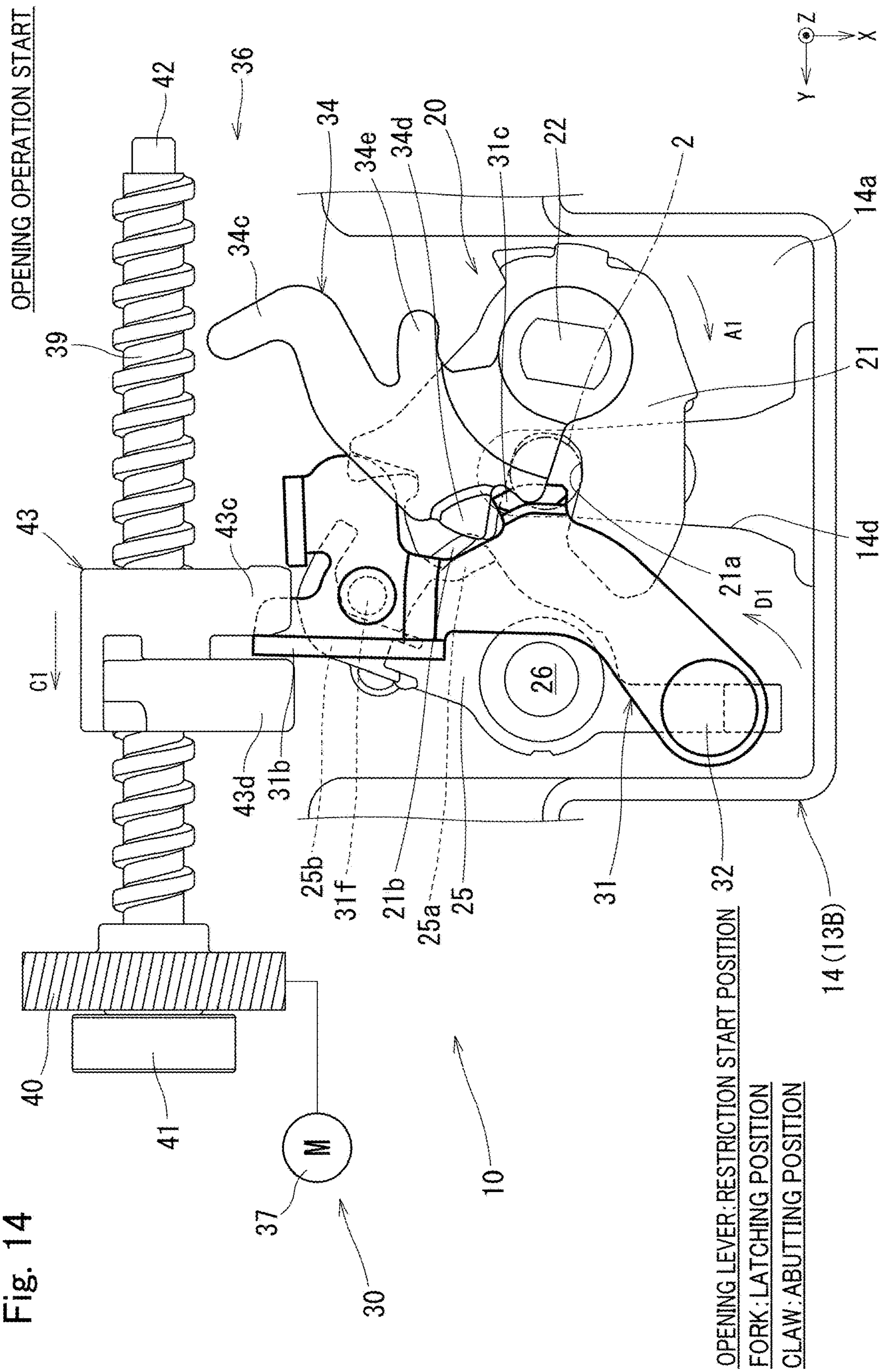
FIG. 14 is a plan view at the time when the opening operation is started in FIG. 11.

The opening lever 31 thus pivotally supported is rotatable about the shaft member 32 in a direction D1 (counterclockwise direction) from an initial position illustrated in FIG. 13, through a restriction start position (first rotational position) illustrated in FIG. 14 and an abutment-releasing position (second rotational position) illustrated in FIG. 16, and to a restriction end position (third rotational position) illustrated in FIG. 19, in the order listed herein. The opening lever 31 is also rotatable about the shaft member 32 in a direction D2 (clockwise) from the restriction end position illustrated in FIG. 19, through the abutment-releasing position illustrated in FIG. 16, and the restriction start position illustrated in FIG. 14, to the initial position illustrated in FIG. 13, in the order listed herein. The restriction start position illustrated in FIG. 14 is spaced apart from the initial position illustrated in FIG. 13 in the direction D1. The abutment-releasing position illustrated in FIG. 16 is at a rotation angle further away from the initial position illustrated in FIG. 13, than the restriction start position illustrated in FIG. 14. The restriction end position illustrated in FIG. 19 is at a rotation angle further away from the initial position illustrated in FIG. 13, than the abutment-releasing position illustrated in FIG. 16.

The opening lever 31 is biased in the direction D2 from the restriction end position illustrated in FIG. 19 toward the initial position illustrated in FIG. 13, by a coil spring (biasing member) 33. One end of the coil spring 33 is engaged with the opening lever 31, and the other end of the coil spring 33 is engaged with the cover plate 16. The rotation of the opening lever 31 beyond the initial position illustrated in FIG. 13 toward the direction D2 is restricted by a stopper (not illustrated) provided to the fence block 15.

The opening lever 31 having rotated to the initial position illustrated in FIG. 13 can neither restrict the rotation of the fork 21 via the fork lever 34, nor make an abutment releasing operation of the claw 25. The opening lever 31 having rotated to the restriction start position illustrated in FIG. 14 restricts the rotation of the fork 21 via the fork lever 34, but cannot make the abutment releasing operation of the claw 25. The opening lever 31 having rotated to the abutment-releasing position illustrated in FIG. 16 restricts the rotation of the fork 21 via the fork lever 34, but releases the abutment of the claw 25 against the fork 21. The opening lever 31 having rotated to the restriction end position illustrated in FIG. 19 ceases to restrict the rotation of the fork 21 via the fork lever 34, and keeps the abutment of the claw 25 against the fork 21 released.

More specifically, the opening lever 31 is disposed above the claw 25, in a manner spaced apart from the claw 25 in the axial direction of the claw shaft 26. The opening lever 31 includes a lever body 31*a*, an opening operation receiving portion 31*b*, a fork restricting portion 31*c*, and a claw actuating portion 31*f*.

The lever body 31*a* has a plate-like shape extending along the XY plane, and is pivotally supported by the shaft member 32. The lever body 31*a* extends along the insertion groove 14*d*, from the shaft member 32 toward the substantial center of the spindle 39 in the vehicle width direction, toward the rear side in the vehicle length direction.

The opening operation receiving portion 31*b* is provided on a rear end on that is a tip of the lever body 31*a* in the vehicle length direction, and receives an opening operation of the slider 43. The opening operation receiving portion 31*b* protrudes upwards from a side edge of the lever body 31*a*, the side edge being an edge on the side of the motor 37 and extending in the vehicle length direction, and extends along the XZ plane. The rear end of the opening operation receiving portion 31*b* in the vehicle length direction is positioned on the front side of the spindle 39 in the vehicle length direction, in a manner spaced apart from the spindle 39. When the opening operation receiving portion 31*b* is pressed in the direction C1 by the slider 43, the opening lever 31 is rotated to open in the direction D1. When the pressing force being exerted on the opening operation receiving portion 31*b* in the direction C1 is released, the opening lever 31 is rotated in the direction D2, by the biasing force of the coil spring 33.

The fork restricting portion 31*c* is provided to restrict the rotation of the fork 21 in a direction toward the open position illustrated in FIG. 20. The fork restricting portion 31*c* is provided near the center of the lever body 31*a* in the vehicle length direction, and protrudes in the vehicle width direction toward the fork lever 34. With the opening lever 31 rotated to the initial position illustrated in FIG. 13, the fork restricting portion 31*c* is at a position spaced apart from the fork lever 34, and permits the fork lever 34 to rotate. With the opening lever 31 rotated to the restriction start position illustrated in FIG. 14 and the abutment-releasing position illustrated in FIG. 16, the fork restricting portion 31*c* butts against the fork lever 34, and restricts the rotation of the fork lever 34. As the opening lever 31 is rotated to the restriction end position illustrated in FIG. 19, the fork restricting portion 31*c* ceases to restrict the rotation of the fork lever 34. More specifically, the fork restricting portion 31*c* has a base portion 31*d* protruding on the same plane as the lever body 31*a*, and a restricting body 31*e* protruding upwards from the tip end of the base portion 31*d*.

Figure 7:
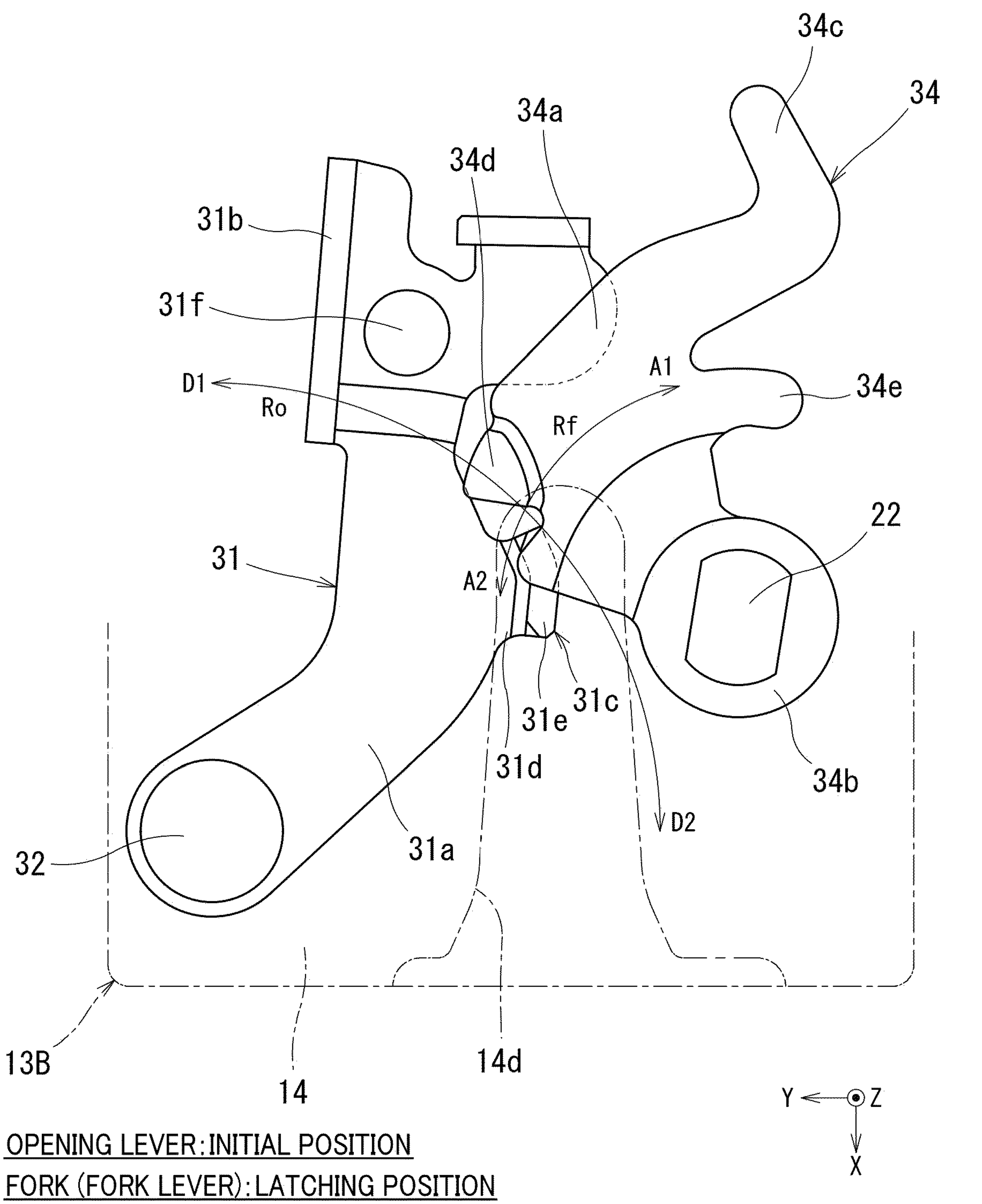
FIG. 7 is a plan view illustrating a relationship among an insertion groove, an opening lever at an initial position, and a fork lever at a latching position.
Figure 8:
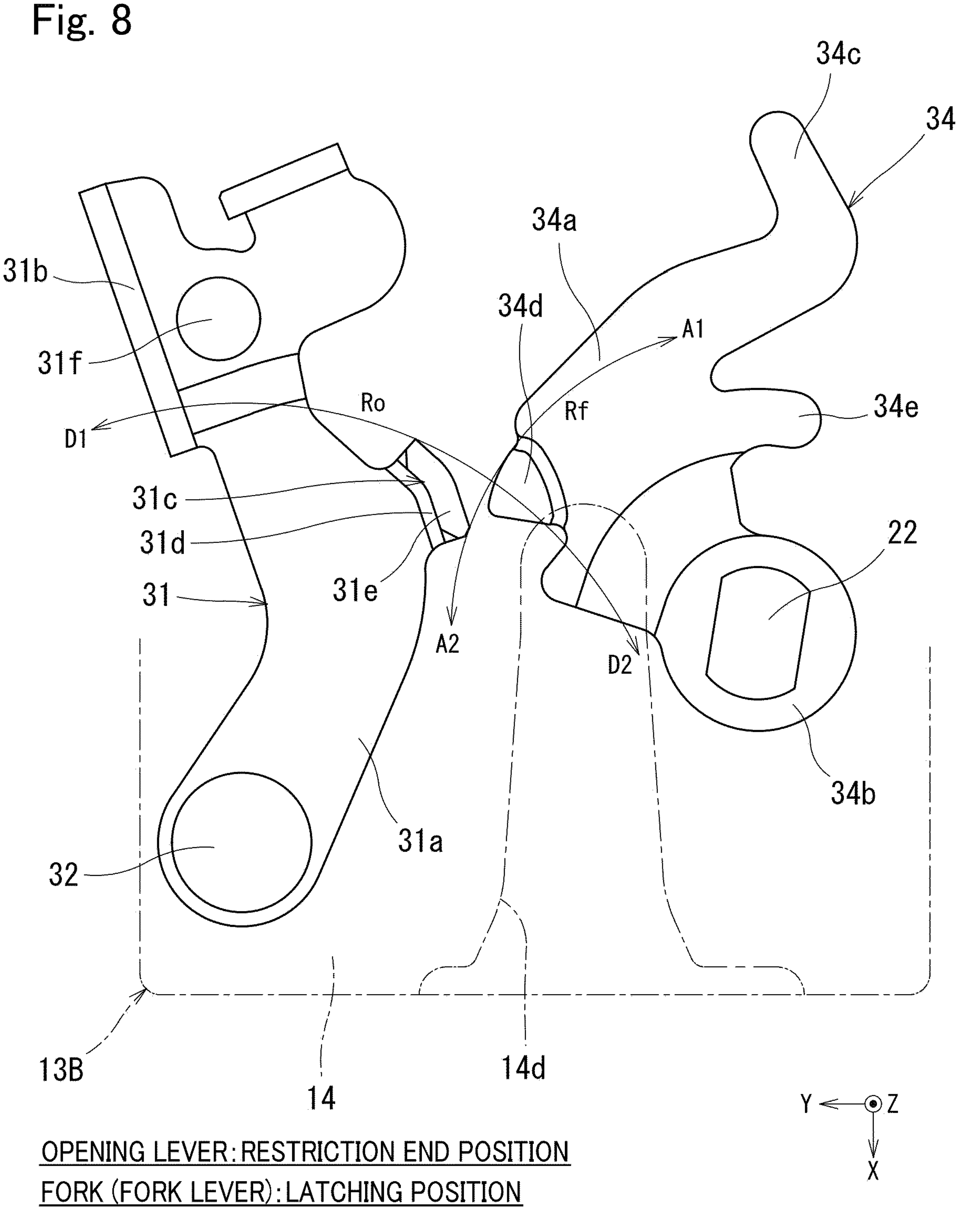
FIG. 8 is a plan view illustrating a relationship among the insertion groove, the opening lever at a restriction end position, and the fork lever at the latching position.

Referring to FIGS. 7 and 8, the restricting body 31*e* has a substantially arc-like shape in a view from the vehicle height direction, and restricts the rotation of the fork 21 toward the open position illustrated in FIG. 20 via the fork lever 34, by butting against the restriction receiving portion 34*d* of the fork lever 34. Furthermore, as the opening lever 31 is rotated in the direction D1, the restricting body 31*e* follows a rotation trajectory Ro that gradually approaches the restriction receiving portion 34*d* of the fork lever 34 and then gradually separates from the restriction receiving portion 34*d*, with respect to the fork 21 being rotated to the latching position. Therefore, the restricting body 31*e* is configured to, as the opening lever 31 is rotated in the direction D1, permit the fork 21 including the fork lever 34 to gradually rotate in the direction A1, and then to gradually rotate in the direction A2, via the restriction receiving portion 34*d*. The relationship between the fork restricting portion 31*c* and the restriction receiving portion 34*d* will be described in detail later.

Figure 10:
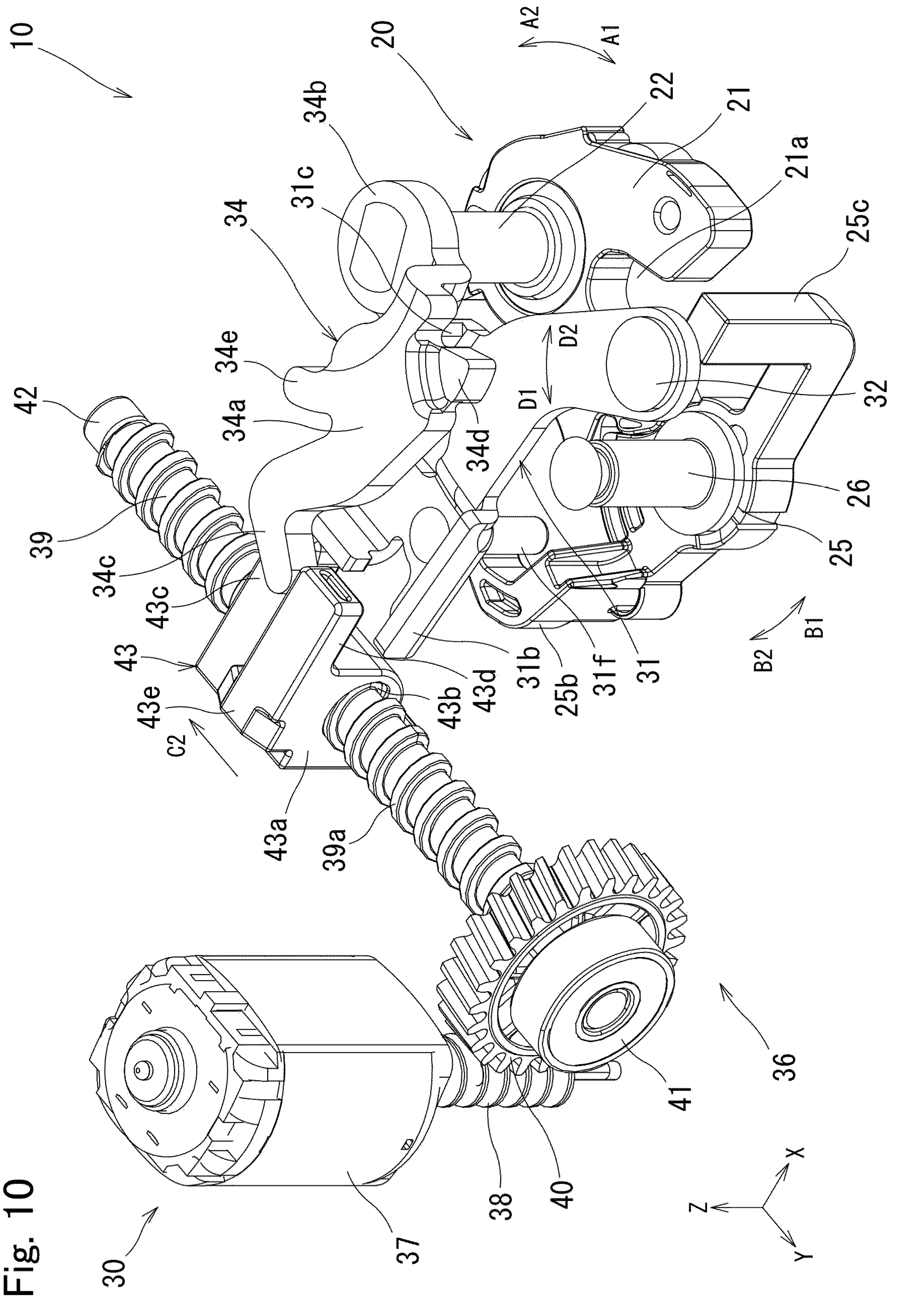
FIG. 10 is a perspective view illustrating a process of the operations of the latch mechanism and the electric opening/closing mechanism when the door is closed.
Figure 11:
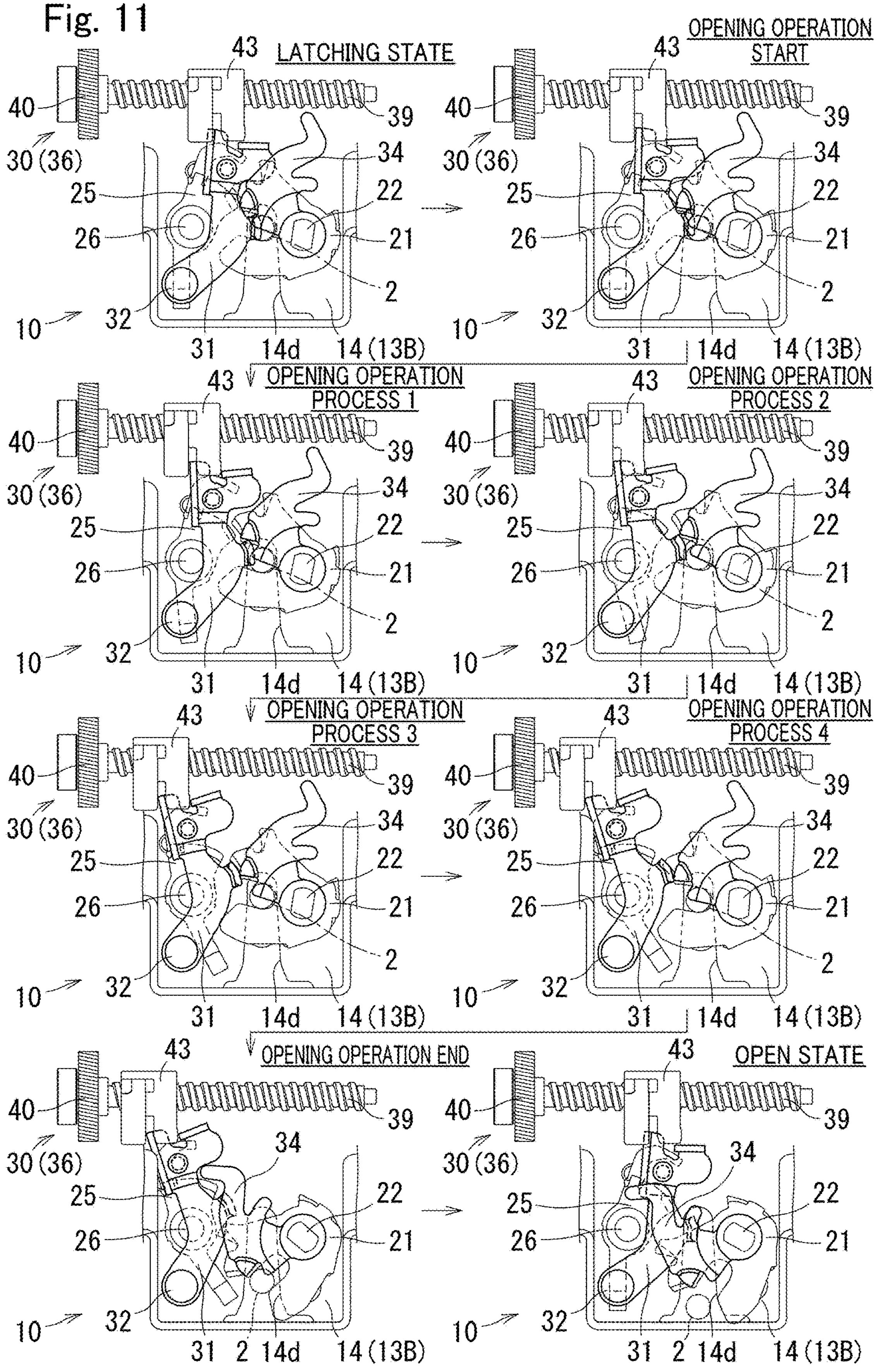
FIG. 11 is a plan view illustrating a series of movements of the latch mechanism and the electric opening/closing mechanism when the door is opened.

Referring to FIGS. 6, 9, and 10, the claw actuating portion 31*f* is provided to rotate the claw 25 from the abutting position illustrated in FIG. 13, through the non-abutting position illustrated in FIG. 19, to the over-rotated position illustrated in FIG. 16. The claw actuating portion 31*f* is a rod body having a cylindrical shape, being a body separate from the lever body 31*a*, and protrudes downwards from a rear side of the lever body 31*a* in the vehicle length direction. With the opening lever 31 rotated to the initial position illustrated in FIG. 13, the claw actuating portion 31*f* is spaced apart from the opening operation receiving portion 25*b* of the claw 25, on the side of the fork 21 in the vehicle width direction. As the opening lever 31 is rotated in the direction D1, the claw actuating portion 31*f* presses the opening operation receiving portion 25*b* (see FIG. 14), and rotates the claw 25 toward the non-abutting position illustrated in FIG. 16.

Referring to FIGS. 9 and 10, the fork lever 34 is provided to integrally rotate the fork 21 via the fork shaft 22, in response to the closing operation of the slider 43 and a restricting operation of the opening lever 31. The fork lever 34 is mounted relatively unrotatably with respect to the fork shaft 22. Referring to FIGS. 4 to 6, the fork lever 34 is disposed on the cover plate 16 of the base 13B, adjacently to the opening lever 31 in the vehicle width direction. That is, the fork lever 34 is disposed above and spaced apart from the fork 21 in the axial direction of the fork shaft 22.

The fork lever 34 thus pivotally supported is integrally rotatable with the fork 21, as the fork 21 rotates to the open position illustrated in FIG. 20, the half-latching position illustrated in FIG. 21, the latching position illustrated in FIG. 13, and the over-latching position illustrated in FIG. 16. That is, when the fork 21 rotates to the open position illustrated in FIG. 20, the fork lever 34 is rotated to a first corresponding position corresponding to thereto. Furthermore, when the fork 21 rotates to the half-latching position illustrated in FIG. 21, the fork lever 34 is rotated to a second corresponding position corresponding thereto. Furthermore, when the fork 21 rotates to the latching position illustrated in FIG. 13, the fork lever 34 is rotated to a third corresponding position corresponding thereto. Furthermore, when the fork 21 rotates to the over-latching position illustrated in FIG. 16, the fork lever 34 is rotated to a fourth corresponding position corresponding thereto. On the contrary, when the fork lever 34 rotates to the first corresponding position illustrated in FIG. 20, the fork 21 is rotated to the open position. When the fork lever 34 rotates to the second corresponding position illustrated in FIG. 21, the fork 21 is rotated to the half-latching position. When the fork lever 34 rotates to the third corresponding position illustrated in FIG. 13, the fork 21 is rotated to the latching position. When the fork lever 34 rotates to the fourth corresponding position illustrated in FIG. 16, the fork 21 is rotated to the over-latching position.

More specifically, the fork lever 34 is made of a hard resin capable of withstanding the operations (pressing) of the opening lever 31 and the slider 43, and includes a lever body 34*a*, a closing operation receiving portion 34*c*, and a restriction receiving portion 34*d*.

The lever body 34*a* includes, on the front end in the vehicle length direction, an attaching portion 34*b* that is placed on the base plate 14, and attached to the fork shaft 22 in a manner relatively unrotatable. The lever body 34*a* extends along the XY plane, in a manner continuous to the top end of the attaching portion 34*b*. The lever body 34*a* is disposed higher than the upper ends of the lever body 31*a* of the opening lever 31 and the restricting body 31*e* of the fork restricting portion 31*c*.

The closing operation receiving portion 34*c* is provided in a manner protruding rearwards from a rear end of the lever body 34*a* in the vehicle length direction, the rear end being at the tip of the lever body 34*a*, and receives a closing operation of the slider 43. The closing operation receiving portion 34*c* has a plate-like shape protruding from the lever body 34*a* along the same plane as the lever body 34*a* and extending along the XY plane, and is positioned higher than the upper end of the opening operation receiving portion 25*b* of the opening lever 31, with a space therebetween. The rear end of the closing operation receiving portion 34*c* in the vehicle length direction is positioned in front of the spindle 39, with a space therebetween, in the vehicle length direction. When the closing operation receiving portion 34*c* is pushed in the direction C2 by the slider 43, the fork lever 34 is rotated integrally with the fork 21 in the direction A1, against the biasing force of the kick spring 23. When the operation of the slider 43 in the direction C2 is released, the fork lever 34 is rotated integrally with the fork 21 in the direction A2, by the biasing force of the kick spring 23.

The restriction receiving portion 34*d* has a tapered triangular shape in a view from the vehicle height direction, and protrudes laterally from the lever body 34*a* toward the opening lever 31 in the vehicle width direction, and also protrudes downwards toward the lever body 31*a* in the vehicle height direction. The bottom surface of the restriction receiving portion 34*d* is positioned lower than the upper end of the restricting body 31*e* of the opening lever 31, and is positioned higher than the upper surface of the base portion 31*d*. In addition to the restriction receiving portion 34*d* and the attaching portion 34*b*, there is no other portion protruding downwards from the lever body 34*a*.

The fork lever 34 has a switch actuating portion 34*e* for operating the rotary switch 51 to switch a connection of the rotary switch 51. The rotary switch 51 outputs different signals depending on the degree by which the rotary switch 51 is rotated by the operation of the switch actuating portion 34*e*. On the basis of an input signal from the rotary switch 51, the ECU 8 illustrated in FIG. 1 can determine to which one of the open position illustrated in FIG. 20, the half-latching position illustrated in FIG. 21, and the latching position illustrated in FIG. 13 the fork 21 is being rotated.

A relationship among the opening operation receiving portion 25*b* of the claw 25, the fork restricting portion 31*c* and the claw actuating portion 31*f* of the opening lever 31, and the restriction receiving portion 34*d* of the fork lever 34 will now be described.

Figure 12:
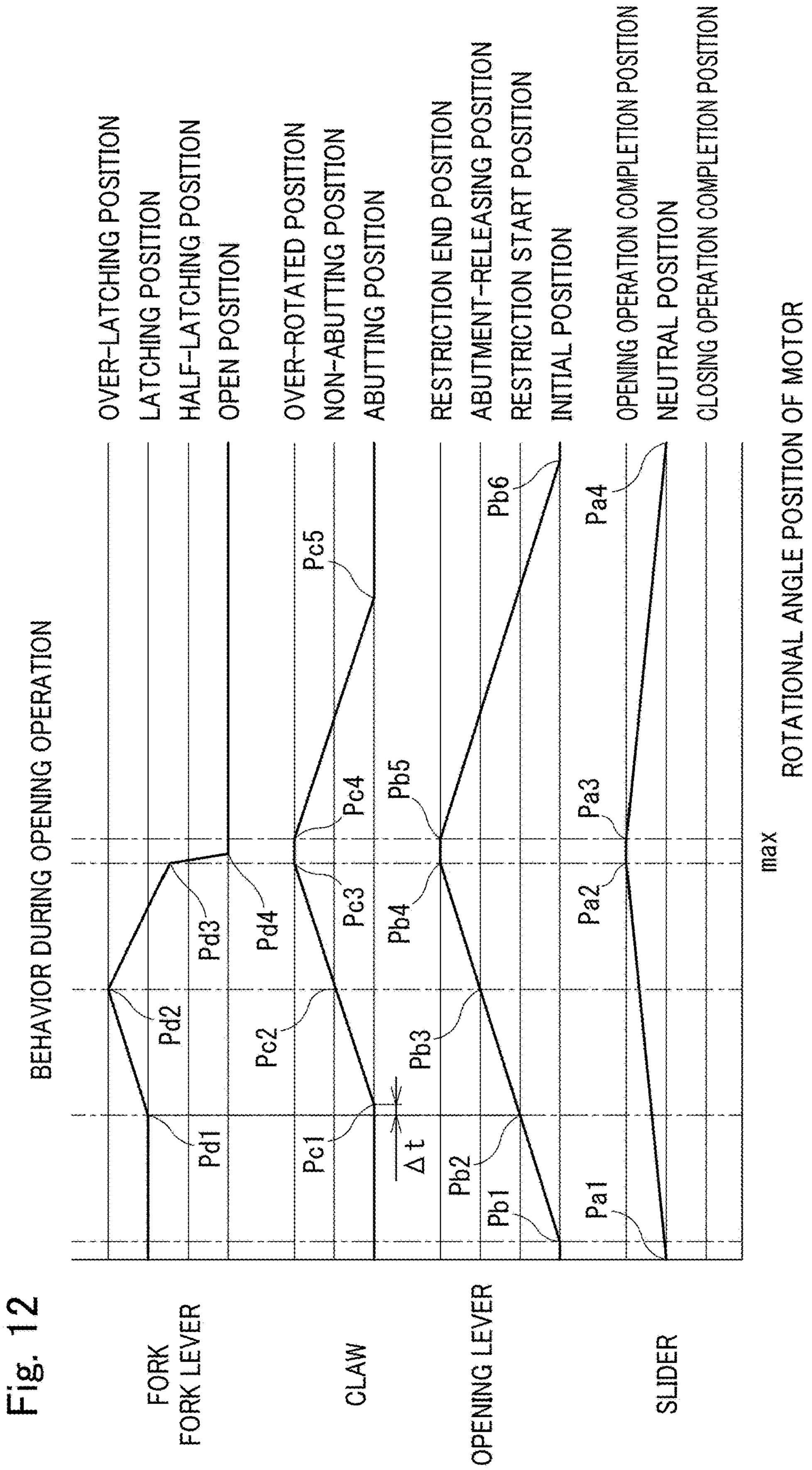
FIG. 12 is a graph illustrating movement of the latch mechanism during an opening operation by the electric opening/closing mechanism.

FIG. 12 is a graph indicating movements of the opening lever 31, the fork 21 including the fork lever 34, and the claw 25, resultant of the opening operation of the driving mechanism 36. The opening operation receiving portion 25*b* of the claw 25, the fork restricting portion 31*c* and the claw actuating portion 31*f* of the opening lever 31, and the restriction receiving portion 34*d* of the fork lever 34 are configured to achieve the movements indicated in FIG. 12.

Referring to FIGS. 7, 12, and 13, with the opening lever 31 rotated to the initial position, the fork restricting portion 31*c* is positioned above the insertion groove 14*d* of the base plate 14. With the fork 21 rotated to the latching position, the restriction receiving portion 34*d* of the fork lever 34 is further on the other side of the insertion groove 14*d* (left side in FIG. 13), than the restricting body 31*e* of the opening lever 31 in the vehicle width direction. In other words, with the opening lever 31 rotated to the initial position and with the fork 21 including the fork lever 34 rotated to the latching position, the fork restricting portion 31*c* is on the inner side in the radial direction of the fork shaft 22, than the restriction receiving portion 34*d*.

With the opening lever 31 rotated to the initial position and with the fork 21 including the fork lever 34 rotated to the latching position, a rotation trajectory Rf of the restriction receiving portion 34*d*, the rotation trajectory Rf being delineated by the rotation of the fork lever 34, is on the outer side of the restricting body 31*e* of the opening lever 31 in the radial direction. The restriction receiving portion 34*d* of the fork lever 34 is on the rotation trajectory Ro of the restricting body 31*e*, the rotation trajectory Ro being delineated by the rotation of the opening lever 31 in the direction D1.

In this manner, with the opening lever 31 rotated to the initial position and with the fork 21 including the fork lever 34 rotated to the latching position, the restriction receiving portion 34*d* cannot be caused to butt against the fork restricting portion 31*c* of the opening lever 31 by rotating the fork lever 34. In other words, the fork restricting portion 31*c* of the opening lever 31 permits the fork 21 including the fork lever 34 to rotate. In addition, by rotating the opening lever 31, the fork restricting portion 31*c* can butt against the restriction receiving portion 34*d* of the fork lever 34.

Furthermore, with the opening lever 31 rotated to the initial position and the claw 25 rotated to the abutting position, the claw actuating portion 31*f* of the opening lever 31 is positioned apart from the opening operation receiving portion 25*b* of the claw 25 that is at the abutting position, in the direction D2. Therefore, in this configuration, the claw actuating portion 31*f* of the opening lever 31 cannot operate the claw 25 at the abutting position.

Once the opening lever 31 is rotated from the initial position (Pb1 in FIG. 12) illustrated in FIG. 13 to the restriction start position (Pb2 in FIG. 12) illustrated in FIG. 14, the fork restricting portion 31*c* butts against the restriction receiving portion 34*d* of the fork lever 34. As a result, the fork restricting portion 31*c* restricts the rotations of the fork 21 and the fork lever 34 toward the open position (Pd1 in FIG. 12). In this configuration, the claw actuating portion 31*f* of the opening lever 31 has not butted against the opening operation receiving portion 25*b* of the claw 25 yet, and does not operate the claw 25 at the abutting position to open (Pc1 in FIG. 12).

When the opening lever 31 is rotated from the restriction start position (Pb2 in FIG. 12) illustrated in FIG. 14 toward the abutment-releasing position (Pb3 in FIG. 12) illustrated in FIG. 16, the fork restricting portion 31*c* is still kept butting against the restriction receiving portion 34*d* of the fork lever 34. That is, the rotations of the fork 21 and the fork lever 34 toward the open position are kept restricted. The fork restricting portion 31*c* also causes the fork 21 to rotate from the latching position toward the over-latching position (Pd2 in FIG. 12) via the fork lever 34. Meanwhile, the claw actuating portion 31*f* of the opening lever 31 butts against the opening operation receiving portion 25*b* (Pc1 in FIG. 12), and rotates the claw 25 toward the non-abutting position (Pc2 in FIG. 12). In other words, the timing at which the claw actuating portion 31*f* butts against the opening operation receiving portion 25*b* and starts rotating the claw 25 (Pc1 in FIG. 12) is later than the timing at which the fork restricting portion 31*c* of the opening lever 31 butts against the restriction receiving portion 34*d* and starts rotating of the fork lever 34 (Pd1 in FIG. 12) (Δt in FIG. 12).

Referring to FIGS. 8 and 19, the rotation trajectory Ro followed by the restricting body 31*e* as the opening lever 31 is being rotated in the direction D1 is in a direction gradually moving away from the restriction receiving portion 34*d* of the fork lever 34. Once the opening lever 31 rotates to the restriction end position, the fork restricting portion 31*c* is on the outer side of the restriction receiving portion 34*d* of the fork lever 34, in the radial direction of the fork shaft 22. Therefore, the restriction receiving portion 34*d* cannot be caused to butt against the fork restricting portion 31*c* of the opening lever 31 by rotating the fork lever 34. That is, at this position, the fork restricting portion 31*c* of the opening lever 31 permits the fork lever 34 including the fork 21 to rotate.

In the manner described above, when the opening lever 31 is rotated from the abutment-releasing position (Pb3 in FIG. 12) illustrated in FIG. 16 toward the restriction end position (Pb4 in FIG. 12) illustrated in FIG. 19, the fork restricting portion 31*c* causes the fork 21 including the fork lever 34 to gradually rotate from the over-latching position (Pd2 in FIG. 12), through the latching position, toward the open position.

The fork restricting portion 31*c* then separates from the restriction receiving portion 34*d* of the fork lever 34 (Pb4 in FIG. 12), and ceases to restrict the rotation of the fork 21. As a result, the fork 21 including the fork lever 34 is rotated toward the open position by the biasing force of the kick spring 23 (Pd4 in FIG. 12). Meanwhile, the claw actuating portion 31*f* of the opening lever 31 is kept butting against the opening operation receiving portion 25*b*, and rotates the claw 25 to the over-rotated position (Pc3 in FIG. 12). That is, the claw actuating portion 31*f* keeps restricting the rotation of the claw 25 toward the abutting position illustrated in FIG. 13.

The driving mechanism 36 is provided to rotate the opening lever 31 from the initial position illustrated in FIG. 13 to the restriction start position illustrated in FIG. 14, the abutment-releasing position illustrated in FIG. 16, and the restriction end position illustrated in FIG. 19 (opening operation). The driving mechanism 36 according to the present embodiment also has a function for rotating the fork 21 from the half-latching position illustrated in FIG. 21 to the latching position illustrated in FIG. 13, via the fork lever 34 (closing operation).

Referring to FIGS. 2 to 5, the motor 37 is a driving source for rotating the spindle 39 so as to cause the slider 43 to move. The motor 37 is a DC motor capable of rotating forwardly and reversely. The motor 37 is disposed in the motor enclosure 18*b* of the cover main body 18 on the rear side of the spindle 39, that is, on the opposite side of the claw 25 with respect to the spindle 39 in the vehicle length direction. The output shaft of the motor 37 protrudes downwards in a manner protruding into the gear enclosure 18*c* of the cover main body 18. The worm (first gear) 38 is integrally rotatably mounted on the output shaft.

The spindle 39 includes a spiral screw thread 39*a*, and is rotated by the motor 37. On an end of the spindle 39 on the side where the motor 37 is positioned, the worm wheel (second gear) 40 that meshes with the worm 38 and receives the driving force of the motor 37 is integrally rotatably mounted, and a ball bearing 41 is also provided. A sliding bearing 42 is disposed at an end of the spindle 39, on the side opposite to the motor 37.

The worm wheel 40 and the ball bearing 41 are disposed inside the gear enclosure 18*c* of the cover main body 18, and the sliding bearing 42 is disposed in the spindle support 18*d* of the cover main body 18. With this, the spindle 39 extends in the vehicle width direction that is orthogonal to the fork shaft 22 and the claw shaft 26, and is rotatably supported. The spindle 39 is positioned at the same height as the cover plate 16 that is the upper end of the base 13B, and is disposed on the rear side of the cover plate 16 in a manner spaced apart from the cover plate 16 in the vehicle length direction.

The slider 43 transmits the rotational force of the spindle 39 that is rotated by the driving force of the motor 37, to the latch mechanism 20 via the opening lever 31 and the fork lever 34, and switches the latch mechanism 20 between the latching state illustrated in FIG. 13 and the open state illustrated in FIG. 20.

Referring to FIGS. 4 to 6, the slider 43 includes a slider main body 43*a* having a screw hole 43*b* that is screwed onto the screw thread 39*a* of the spindle 39. The rotation of the slider 43 about the spindle 39 is restricted by the slider main body 43*a* butting against the rear cover 19 illustrated in FIG. 2. In this manner, the slider 43 moves in the direction C1 toward the claw 25 as the spindle 39 is rotated forwardly, and moves in the direction C2 toward the fork 21 as the spindle 39 is rotated reversely.

The slider 43 includes an opening actuating portion 43*c* for operating the opening lever 31 and a closing actuating portion 43*d* for operating the fork lever 34. Each of the opening actuating portion 43*c* and the closing actuating portion 43*d* has a quadrangular prism shape, protrudes from the slider main body 43*a* frontwards in the vehicle length direction, and is disposed in a manner spaced apart from the other in the vertical direction (see FIG. 3). That is, the opening actuating portion 43*c* and the closing actuating portion 43*d* are disposed adjacently to each other in the vehicle height direction, and the closing actuating portion 43*d* is positioned higher than the opening actuating portion 43*c*. The opening actuating portion 43*c* is provided to the slider main body 43*a*, on the side of the fork 21 in the vehicle width direction, at the same height as the opening operation receiving portion 31*b* of the opening lever 31. As the slider 43 is moved in the direction C1, the opening actuating portion 43*c* butts against the opening operation receiving portion 31*b* of the opening lever 31, but does not butt against the closing operation receiving portion 34*c* of the fork lever 34 when the slider 43 is moved in the direction C2. The closing actuating portion 43*d* is provided to the slider main body 43*a* on the side of the claw 25 in the vehicle width direction, at the same height as the closing operation receiving portion 34*c* of the fork lever 34. As the slider 43 is moved in the direction C2, the closing actuating portion 43*d* butts against the closing operation receiving portion 34*c* of the fork lever 34, but does not butt against the opening operation receiving portion 31*b* of the opening lever 31 when the slider 43 moves in the direction C1. That is, the opening actuating portion 43*c* and the closing actuating portion 43*d* are disposed adjacently to each other on the right and the left sides in the vehicle width direction, and the opening actuating portion 43*c* is on the right side of the closing actuating portion 43*d*. As a result, a long stroke can be ensured between a neutral position (Pa1 in FIG. 12) and an opening operation completion position (Pa2 in FIG. 12) of the slider 43, so that the degree of freedom in design can be improved.

The slider 43 is also provided with a switch actuating portion 43*e* for operating the switch 52, on a part on the rear side the closing actuating portion 43*d* in the vehicle length direction. Referring to FIG. 2, the switch 52 is mounted on the cover main body 18 above the switch actuating portion 43*e* of the slider 43 at the neutral position illustrated in FIGS. 13, 20, and 21. The neutral position herein is a position where neither the opening lever 31 is operated by the opening actuating portion 43*c* nor the fork lever 34 is operated by the closing actuating portion 43*d*. The switch 52 is operated by the switch actuating portion 43*e* when the slider 43 moves to the neutral position. As the switch 52, it is possible to use a push switch configured to output a signal while the push switch is being operated by the switch actuating portion 43*e*, and not to output a signal with no operation of the switch actuating portion 43*e*. The ECU 8 can determine whether the slider has moved to the neutral position on the basis of an input signal from the switch 52.

Switching of Latch Mechanism by Electric Opening/Closing Mechanism

Next, switching of the latch mechanism 20 by the electric opening/closing mechanism 30 will be described specifically, with reference to FIGS. 11 and 12 and FIGS. 13 to 20.

With the back door 4 closed with respect to the vehicle body 1 illustrated in FIG. 1, the fork 21 including the fork lever 34 is at the latching position, and in abutment with the claw 25 at the abutting position, as illustrated in FIG. 13. The opening lever 31 is kept at the initial position by the biasing force of the coil spring 33. The slider 43 is at the neutral position where neither the opening lever 31 nor the fork lever 34 is operated.

When the open switch (not illustrated) of the back door 4 illustrated in FIG. 1 is operated, the ECU 8 illustrated in FIG. 1 causes the motor 37 to rotate the spindle 39 forwardly. As a result, the slider 43 starts moving in the direction C1 from the neutral position (Pa1 in FIG. 12) to the opening operation completion position (Pa2 in FIG. 12). The fork 21, the fork lever 34, the claw 25, and the opening lever 31 at this time are maintained at the latching position, the abutting position, and the initial position, respectively.

As a result of the movement of the slider 43 in the direction C1, the opening actuating portion 43*c* of the slider 43 butts against the opening operation receiving portion 31*b*, and causes the opening lever 31 to start rotating in the direction D1 (Pb1 in FIG. 12). When the opening lever 31 is rotated to the restriction start position (Pb2 in FIG. 12), as illustrated in FIG. 14, the fork restricting portion 31*c* butts against the restriction receiving portion 34*d*, and presses the fork 21 including the fork lever 34 in the direction A1 (Pd1 in FIG. 12). As a result, the fork 21 including the fork lever 34 is restricted from rotating toward the open position, and is gradually rotated toward the over-latching position.

Figure 15:
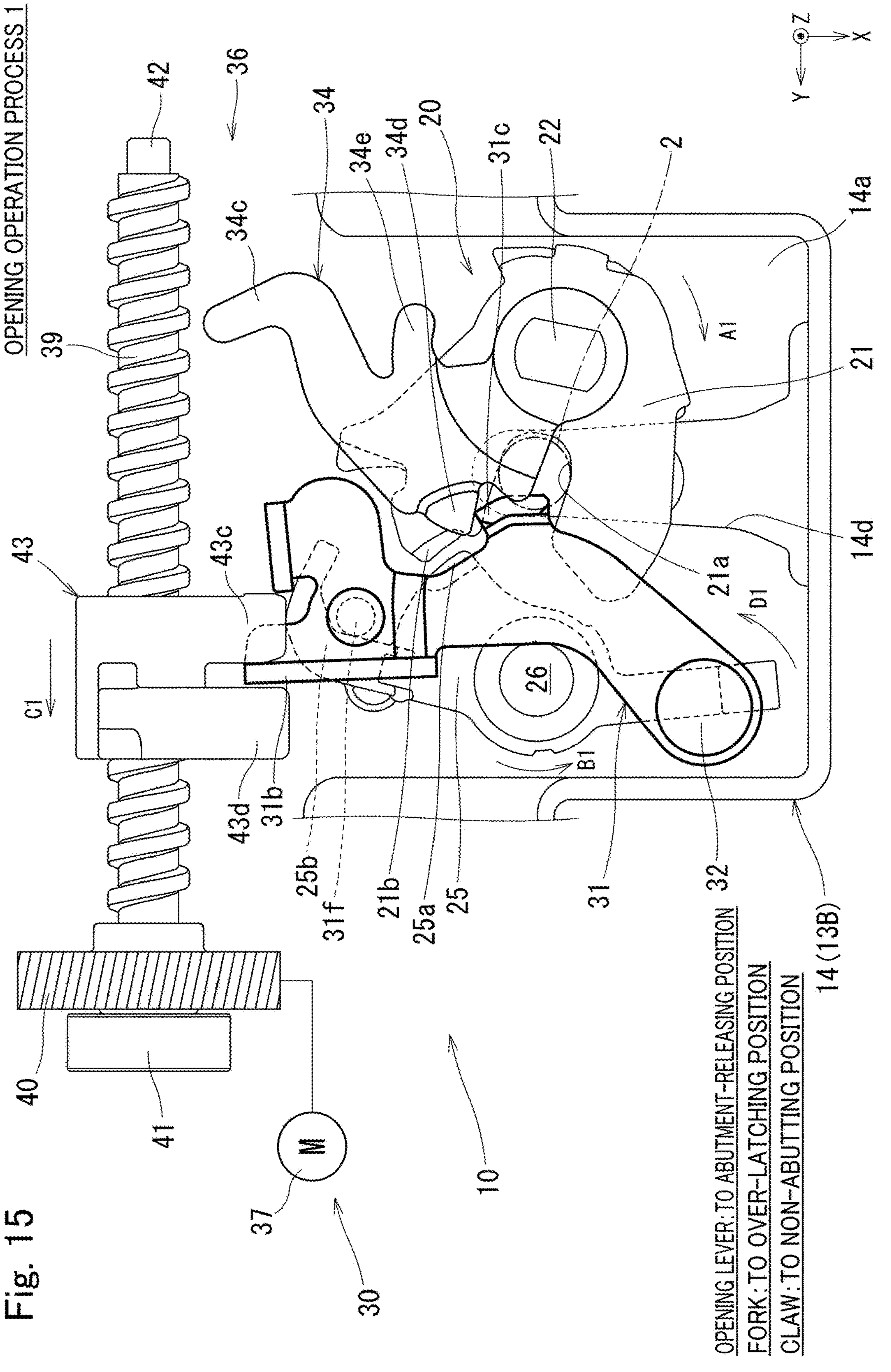
FIG. 15 is a plan view of an opening operation process 1 illustrated in FIG. 11.

As the opening lever 31 continues to rotate toward the abutment-releasing position, the claw actuating portion 31*f* butts against the opening operation receiving portion 25*b*, and rotates the claw 25 toward the non-abutting position (Pc1 in FIG. 12), as illustrated in FIG. 15. The fork 21 including the fork lever 34 is kept rotating toward the over-latching position.

As a result of the opening lever 31 being rotated to the abutment-releasing position, the claw 25 is rotated to the non-abutting position (Pc2 in FIG. 12), as illustrated in FIG. 16. The fork 21 including the fork lever 34 is rotated to the over-latching position (Pd2 in FIG. 12).

Figure 17:
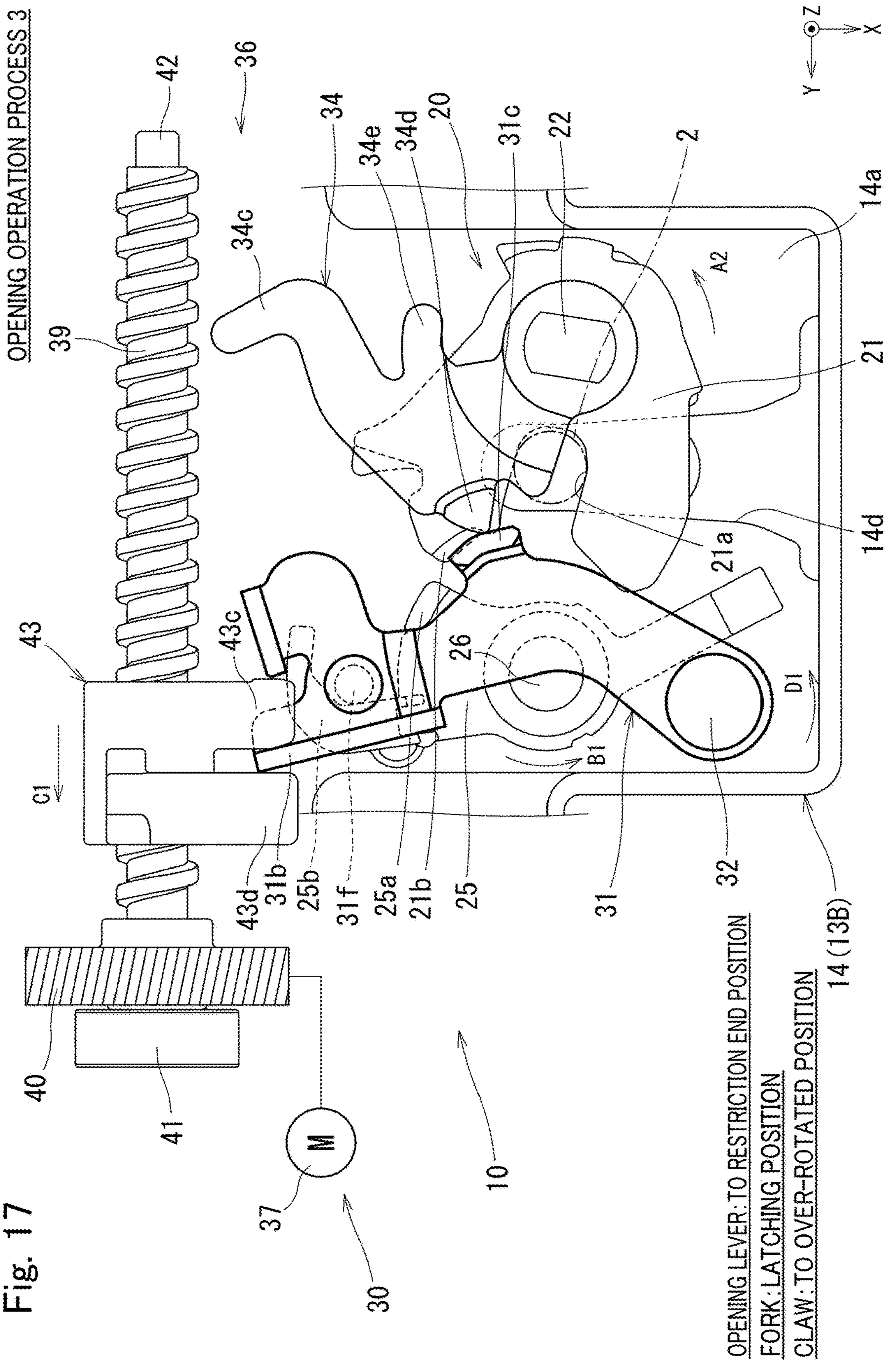
FIG. 17 is a plan view of an opening operation process 3 illustrated in FIG. 11.

When the slider 43 causes the opening lever 31 to further rotate in the direction D1 toward the restriction end position, the claw 25 is further rotated toward the over-rotated position, as illustrated in FIG. 17. The fork restricting portion 31*c* of the opening lever 31 then gradually separates from the restriction receiving portion 34*d* of the fork lever 34. As a result, the fork 21 including the fork lever 34 is carried to face the latching position and gradually rotated in the direction A2, by the elastic force of the weather strip 3 illustrated in FIG. 1, and the biasing force of the kick spring 23 illustrated in FIG. 4.

Figure 18:
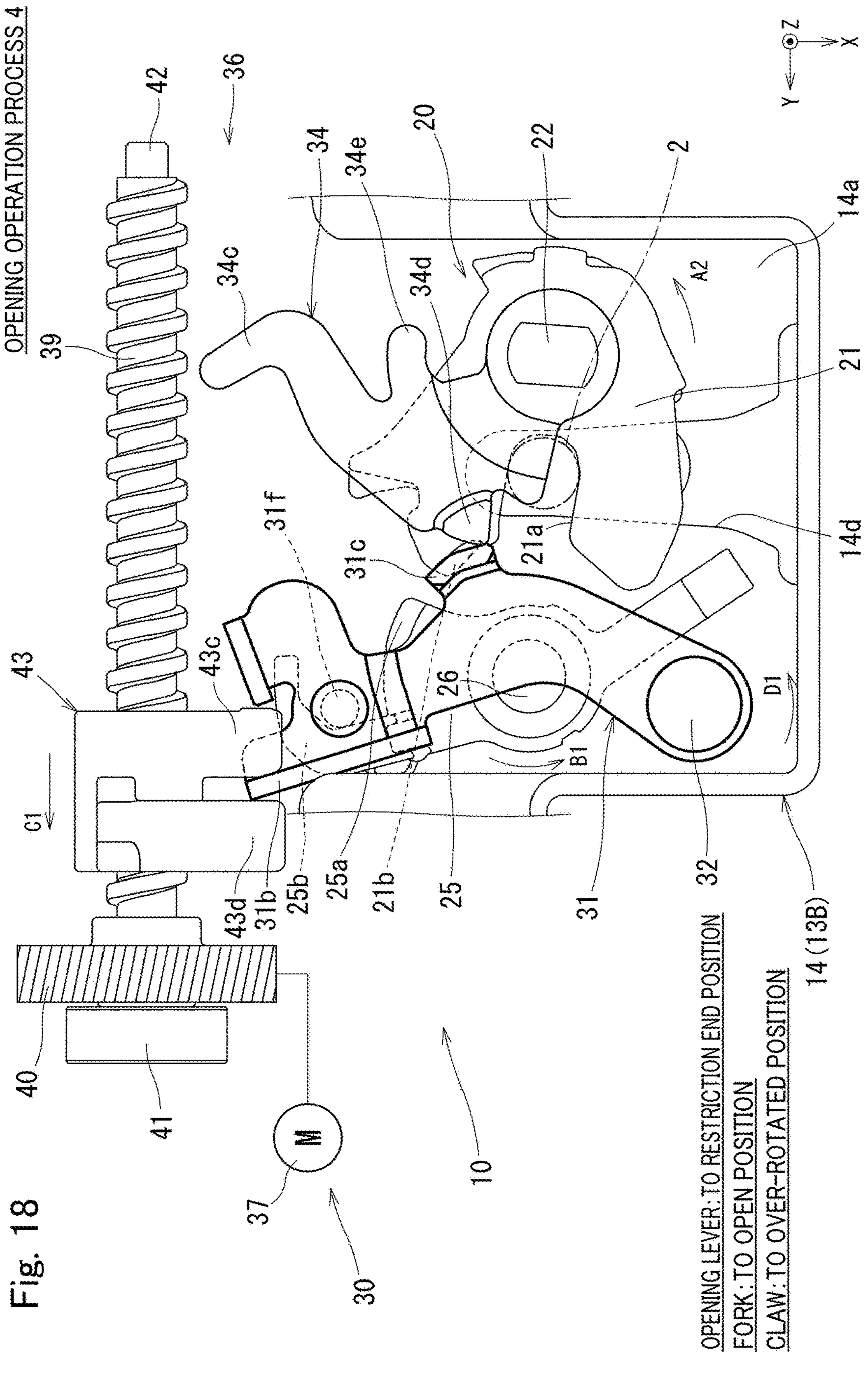
FIG. 18 is a plan view of an opening operation process 4 illustrated in FIG. 11.

As the opening lever 31 is rotated, the restriction receiving portion 34*d* of the fork lever 34 arrives at the end of the fork restricting portion 31*c*, as illustrated in FIG. 18. When the opening lever 31 is rotated beyond this position to the restriction end position (Pb4 in FIG. 12), the butting of the fork restricting portion 31*c* against the restriction receiving portion 34*d* is released, as illustrated in FIG. 19. As a result, the opening lever 31 ceases to restrict the rotation of the fork 21 including the fork lever 34 (Pd3 in FIG. 12). Consequently, the fork 21 including the fork lever 34 is rotated to the open position by the elastic force of the weather strip 3 illustrated in FIG. 1 and the biasing force of the kick spring 23 illustrated in FIG. 4 (Pd4 in FIG. 12). The claw 25 is rotated to the over-rotated position by the opening lever 31 (Pc3 in FIG. 12).

The ECU 8 having detected the rotation of the fork 21 and the fork lever 34 to the open position, on the basis of the signal from the rotary switch 51 illustrated in FIG. 2, causes the motor 37 to rotate reversely. As a result, the slider 43 starts moving in the direction C2 from the opening operation completion position (Pa3 in FIG. 12) to the neutral position (Pa4 in FIG. 12).

With this, the opening lever 31 is then caused to rotate in the direction D2 from the restriction end position (Pb5 in FIG. 12) to the initial position (Pb6 in FIG. 12) by the biasing force of the coil spring 33, as illustrated in FIG. 20. The claw 25 is rotated in the direction B2 from the over-rotated position (Pc4 in FIG. 12) to the abutting position (Pc5 in FIG. 12), by the biasing force of the kick spring 27, in a manner associated with the rotation of the opening lever 31. The fork 21 including the fork lever 34 is kept rotating to the open position, by the biasing force of the kick spring 23 illustrated in FIG. 4.

While the back door 4 is open, as illustrated in FIG. 1, the opening lever 31 is at the initial position, the fork 21 including the fork lever 34 at the open position, and the claw 25 is at the abutting position, as illustrated in FIG. 20. When the back door 4 illustrated in FIG. 1 is closed from this configuration, the fork 21 including the fork lever 34 is rotated to the half-latching position, as illustrated in FIG. 21. The ECU 8 detecting this configuration on the basis of the signal from the rotary switch 51 illustrated in FIG. 2, causes the motor 37 to rotate reversely, and causes the slider 43 to move from the neutral position toward the closing operation completion position (closing operation), in the direction C2.

In the closing operation of the electric opening/closing mechanism 30, as illustrated in FIG. 10, as the slider 43 moves in the direction C2, the closing actuating portion 43*d* of the slider 43 butts against the closing operation receiving portion 34*c*, and rotates the fork lever 34 and the fork 21 in the direction A1. When the fork 21 including the fork lever 34 is rotated to the over-latching position, the slider 43 is moved to the neutral position in the direction C1. As a result, the fork 21 including the fork lever 34 is rotated to the latching position, by the biasing force of the kick spring 23 illustrated in FIG. 4, is kept in abutment with the claw 25 at the abutting position, and enters the latching state illustrated in FIG. 13.

In the closing operation of the electric opening/closing mechanism 30, the opening lever 31 is kept at the initial position. Only while the full-latch abutment 21*b* of the fork 21 passes across the abutment 25*a* of the claw 25, the claw 25 is rotated toward the non-abutting position instantaneously, against the biasing force of the kick spring 27 illustrated in FIG. 4.

The door latch device 10 having such a configuration has the following features.

When the door is to be opened, the opening lever 31 causes the fork restricting portion 31*c* to restrict the rotation of the fork 21 to the open position, and then causes the claw actuating portion 31*f* to rotate the claw 25 from the abutting position to the non-abutting position. The fork restricting portion 31*c* then ceases to restrict the rotation of the fork 21 toward the open position, with the claw actuating portion 31*f* restricting the rotation of the claw 25 toward the abutting position. As a result, because the fork 21 can be rotated from the latching position to the open position, the back door 4 can be automatically opened reliably.

The opening lever 31 having the fork restricting portion 31*c* and the claw actuating portion 31*f* is pivotally supported on the other side of the insertion groove 14*d*, the other side being on the same side as the claw 25, and is disposed spaced apart from the claw 25 in the axial direction of the claw shaft 26. Therefore, it is not necessary to ensure a space for disposing the opening lever 31 on the same plane as the claw 25. That is, by positioning the opening lever 31 three-dimensionally with respect to the fork 21 and the claw 25, it is possible to reduce the projection area on the base 13B, the projection area being an area occupied by the projection of these elements, in a view from the vehicle height direction that is the direction in which the claw shaft 26 extends. As a result, the door latch device 10 can be reduced in size.

The restriction receiving portion 34*d*, against which the fork restricting portion 31*c* of the opening lever 31 butts, is provided on the fork lever 34, which is provided a manner spaced part from the fork 21 in the axial direction of the fork shaft 22. With this, it is possible to improve the degree of freedom in the design of the shape, the arrangement, and the like of the restriction receiving portion 34*d*, and to reduce the size and the range of the rotation of the opening lever 31. Hence, the door latch device 10 can be reduced in size. More specifically, in the conventional door latch device, the operating member is rotated by an angle range of 180 degrees, but in the present embodiment, the rotational angle range of the opening lever 31 corresponding thereto can be reduced down to 23 degrees.

While the opening lever 31 is at the initial position illustrated in FIG. 13, the fork restricting portion 31*c* is positioned on the inner side of the restriction receiving portion 34*d*, in the radial direction of the fork shaft 22; and while the opening lever 31 is at the restriction end position illustrated in FIG. 19, the fork restricting portion 31*c* is positioned on the outer side of the restriction receiving portion 34*d* in the radial direction of the fork shaft 22. In either one of these configurations, the fork restricting portion 31*c* cannot be caused to butt against the restriction receiving portion 34*d* by rotating the fork lever 34. With such a configuration, because the range of the rotation of the opening lever 31 can be reduced, the required area of the base 13B can be reduced greatly, so that the door latch device 10 can be reduced in size.

When the fork 21 is at the latching position illustrated in FIG. 13, the restriction receiving portion 34*d* is on the other side of the insertion groove 14*d*. In other words, although the fork lever 34 is on one side of the insertion groove 14*d*, the restriction receiving portion 34*d* is disposed on the other side of the insertion groove 14*d*, the other side being the side where the claw 25 and the opening lever 31 are positioned. In this manner, because the restriction receiving portion 34*d* is provided near the claw 25, the opening lever 31 including the fork restricting portion 31*c* butting against the restriction receiving portion 34*d* can be reduced in size.

The motor 37, the spindle 39, and the slider 43 are disposed on the opposite side of the open end of the insertion groove 14*d* with respect to the claw 25, and the opening lever 31 is pivotally supported nearer to the open end of the insertion groove 14*d*, than the claw shaft 26. With this, because the entire length of the lever body 31*a* of the opening lever 31 is made available, the driving force of the motor 37 for causing the slider 43 to actuate the operation receiving portion 31*b* of the opening lever 31 can be reduced. Therefore, the slider 43 can rotate the opening lever 31 reliably from the initial position illustrated in FIG. 13 to the restriction end position illustrated in FIG. 19. Therefore, the claw 25 can be rotated toward the non-abutting position illustrated in FIG. 16 without causing malfunction, so that the fork 21 can be reliably rotated from the latching position illustrated in FIG. 13 to the open position illustrated in FIG. 20. Furthermore, even with a limited range of operation by which the slider 43 moves forwardly and reversely along the spindle 39, a sufficient length can be ensured for the rotation stroke of the opening lever 31, that is, sufficient distances can be ensured for the movement the fork restricting portion 31*c* and the claw actuating portion 31*f*. Therefore, the fork 21 and the claw 25 can be operated by appropriate amounts at appropriate timings, and the degree of freedom in the design can be improved.

By rotating the opening lever 31 from the restriction start position illustrated in FIG. 14 to the abutment-releasing position illustrated in FIG. 16, the fork restricting portion 31*c* is caused to rotate the fork 21 from the latching position illustrated in FIG. 14 to the over-latching position illustrated in FIG. 16. Furthermore, the claw actuating portion 31*f* is caused to rotate the claw 25 from the abutting position illustrated in FIG. 14 to the non-abutting position illustrated in FIG. 16. In other words, the claw actuating portion 31*f* is caused to rotate the claw 25 from the abutting position illustrated in FIG. 14 to the non-abutting position illustrated in FIG. 16 while the claw 25 is released from the pressing force of the kick spring 23 being exerted on the fork 21. Therefore, it is possible to reduce the driving force of the motor 37 required to rotate the claw 25.

In addition, by rotating the opening lever 31 from the abutment-releasing position illustrated in FIG. 16 to the restriction end position illustrated in FIG. 19, the fork restricting portion 31*c* gradually rotates the fork 21 from the over-latching position illustrated in FIG. 16, through the latching position illustrated in FIG. 17, to the open position illustrated in FIG. 18, and then ceases to restrict the rotation of the fork 21. Therefore, it is possible to inhibit a sudden rotation of the fork 21 from the latching position to the open position, due to the elastic force of the weather strip 3 for providing sealing between the vehicle body 1 and the back door 4. Therefore, it is possible to suppress the generation of vibration and abnormal noise of the fork 21.

Note that the present invention is not limited to the configuration according to the embodiment described above, and various modifications are still possible.

The opening lever 31 may be configured to directly operate the fork 21, without the intermediation of the fork lever 34. In other words, the electric opening/closing mechanism 30 may have a configuration without the fork lever 34.

The shape and positioning of the fork restricting portion 31*c* of the opening lever 31 may be changed as required, as long as the fork restricting portion is prohibited from butting against the restriction receiving portion 34*d* of the fork lever 34 when the fork restricting portion is at the initial position illustrated in FIG. 13, and when the fork restricting portion is at the restriction end position illustrated in FIG. 19.

The shape and positioning of the restriction receiving portion 34*d* provided to the fork lever 34 may be changed as required, as long as the restriction receiving portion 34*d* is on the rotation trajectory Ro of the fork restricting portion 31*c* of the opening lever 31, when the fork 21 is at the latching position illustrated in FIG. 13.

As the driving mechanism 36, a general spur gear (gear) may be used as long as the driving force of the motor 37 can be transmitted to the spindle 39. Furthermore, the driving mechanism 36 may be changed as required, as long as the opening lever 31 can be operated to open. The driving mechanism 36 may be configured to perform only the opening operation, without performing the closing operation of the fork 21.

What is claimed is:

1. A door latch device comprising:

a base that has an insertion groove into which a striker is insertable;

a fork that is mounted on a fork shaft disposed on the base, on one side of the insertion groove, the one side being one side in a direction intersecting with a direction in which the insertion groove extends, that is rotatable between a latching position for holding the striker and an open position at which the striker is releasable, and is biased in a direction from the latching position toward the open position by a biasing member;

a claw that is pivotally supported by a claw shaft disposed on the base, on another side of the insertion groove in the direction intersecting with direction in which the insertion groove extends, and extending along the fork shaft, that is rotatable between an abutting position where the claw comes into abutment against the fork at the latching position and a non-abutting position where the abutment against the fork is released and the fork is allowed to be rotated by the biasing member;

an opening lever that includes a fork restricting portion configured to restrict a rotation of the fork toward the open position and a claw actuating portion configured to rotate the claw from the abutting position to the non-abutting position, that is pivotally supported on the base on the other side of the insertion groove, and that is disposed spaced apart from the claw in an axial direction of the claw shaft; and a driving mechanism that rotates the opening lever from an initial position to a first rotational position spaced apart from the initial position, a second rotational position further away from the initial position than the first rotational position, and a third rotational position further away from the initial position than the second rotational position, wherein when the opening lever is at the initial position, the fork restricting portion allows the fork to rotate, and the claw actuating portion keeps the claw at the abutting position, a rotation of the opening lever from the initial position to the first rotational position causes the fork restricting portion to restrict rotation of the fork toward the open position, a rotation of the opening lever from the first rotational position to the second rotational position causes the claw actuating portion to rotate the claw from the abutting position to the non-abutting position, and a rotation of the opening lever from the second rotational position to the third rotational position causes the fork restricting portion to cease to restrict the rotation of the fork toward the open position, while causing the claw actuating portion to restrict rotation of the claw toward the abutting position, wherein the fork is mounted on the fork shaft integrally rotatably, a fork lever is mounted on the fork shaft integrally rotatably, and adjacently to the opening lever, in a manner spaced apart from the fork in an axial direction of the fork shaft, and the fork lever has a restriction receiving portion against which the fork restricting portion butts.

2. The door latch device according to claim 1, wherein when the opening lever is at the initial position, the fork restricting portion is on an inner side, in a radial direction of the fork shaft, with respect to the restriction receiving portion, and is not allowed to butt against the restriction receiving portion by a rotation of the fork lever, and when the opening lever is at the third rotational position, the fork restricting portion is on an outer side, in the radial direction of the fork shaft, with respect to the restriction receiving portion, and is not allowed to butt against the restriction receiving portion by a rotation of the fork lever.

3. The door latch device according to claim 2, wherein, when the fork is at the latching position, the restriction receiving portion is positioned on another side of the insertion groove, and is positioned on a rotation trajectory of the fork restricting portion, the rotation trajectory being delineated as the opening lever is rotated.

4. The door latch device according to claim 1, wherein the driving mechanism includes a motor disposed on a side opposite to an open end of the insertion groove with respect to the claw, in a direction in which the insertion groove extends, and a spindle extending in a direction intersecting with the insertion groove and being driven in rotation by the motor, and a slider that is screwed onto the spindle in a manner movable forwardly and reversely, and that operates the opening lever, and the opening lever includes a lever body that is pivotally supported on a side nearer to the open end of the insertion groove than the claw shaft, and that extends along the insertion groove toward the spindle, and an operation receiving portion that is provided at a tip of the lever body and receives an operation of the slider.

5. The door latch device according to claim 1, wherein the fork is rotatable from the open position to an over-latching position that is further away from the open position than the latching position, via the latching position, the claw is rotatable from the abutting position to an over-rotated position that is further away from the abutting position than the non-abutting position, via the non-abutting position, by rotating the opening lever from the first rotational position to the second rotational position, the fork restricting portion is caused to rotate the fork from the latching position to the over-latching position against a biasing force of the biasing member, and by rotating the opening lever being rotated from the second rotational position to the third rotational position, the claw actuating portion is caused to rotate the claw from the non-abutting position to the over-rotated position, and the fork restricting portion is caused to gradually rotate the fork from the over-latching position, through the latching position, to the open position, and then ceases to restrict the rotation of the fork.

6. The door latch device according to claim 1, wherein the driving mechanism includes a motor disposed on a side opposite to an open end of the insertion groove with respect to the claw, in a direction in which the insertion groove extends, and a spindle extending in a direction intersecting with the insertion groove and being driven in rotation by the motor, and a slider that is screwed onto the spindle in a manner movable forwardly and reversely, and that operates the opening lever, and the opening lever includes a lever body that is pivotally supported on a side nearer to the open end of the insertion groove than the claw shaft, and that extends along the insertion groove toward the spindle, and an operation receiving portion that is provided at a tip of the lever body and receives an operation of the slider.

7. The door latch device according to claim 2, wherein the driving mechanism includes
a motor disposed on a side opposite to an open end of the insertion groove with respect to the claw, in a direction in which the insertion groove extends, and
a spindle extending in a direction intersecting with the insertion groove and being driven in rotation by the motor, and
a slider that is screwed onto the spindle in a manner movable forwardly and reversely, and that operates the opening lever, and
the opening lever includes
a lever body that is pivotally supported on a side nearer to the open end of the insertion groove than the claw shaft, and that extends along the insertion groove toward the spindle, and
an operation receiving portion that is provided at a tip of the lever body and receives an operation of the slider.

8. The door latch device according to claim 3, wherein the driving mechanism includes
a motor disposed on a side opposite to an open end of the insertion groove with respect to the claw, in a direction in which the insertion groove extends, and
a spindle extending in a direction intersecting with the insertion groove and being driven in rotation by the motor, and
a slider that is screwed onto the spindle in a manner movable forwardly and reversely, and that operates the opening lever, and
the opening lever includes
a lever body that is pivotally supported on a side nearer to the open end of the insertion groove than the claw shaft, and that extends along the insertion groove toward the spindle, and
an operation receiving portion that is provided at a tip of the lever body and receives an operation of the slider.

9. The door latch device according to claim 1, wherein
the fork is rotatable from the open position to an over-latching position that is further away from the open position than the latching position, via the latching position,
the claw is rotatable from the abutting position to an over-rotated position that is further away from the abutting position than the non-abutting position, via the non-abutting position,
by rotating the opening lever from the first rotational position to the second rotational position, the fork restricting portion is caused to rotate the fork from the latching position to the over-latching position against a biasing force of the biasing member, and
by rotating the opening lever being rotated from the second rotational position to the third rotational position, the claw actuating portion is caused to rotate the claw from the non-abutting position to the over-rotated position, and the fork restricting portion is caused to gradually rotate the fork from the over-latching position, through the latching position, to the open position, and then ceases to restrict the rotation of the fork.

10. The door latch device according to claim 2, wherein
the fork is rotatable from the open position to an over-latching position that is further away from the open position than the latching position, via the latching position,
the claw is rotatable from the abutting position to an over-rotated position that is further away from the abutting position than the non-abutting position, via the non-abutting position,
by rotating the opening lever from the first rotational position to the second rotational position, the fork restricting portion is caused to rotate the fork from the latching position to the over-latching position against a biasing force of the biasing member, and
by rotating the opening lever being rotated from the second rotational position to the third rotational position, the claw actuating portion is caused to rotate the claw from the non-abutting position to the over-rotated position, and the fork restricting portion is caused to gradually rotate the fork from the over-latching position, through the latching position, to the open position, and then ceases to restrict the rotation of the fork.

11. The door latch device according to claim 3, wherein
the fork is rotatable from the open position to an over-latching position that is further away from the open position than the latching position, via the latching position,
the claw is rotatable from the abutting position to an over-rotated position that is further away from the abutting position than the non-abutting position, via the non-abutting position,
by rotating the opening lever from the first rotational position to the second rotational position, the fork restricting portion is caused to rotate the fork from the latching position to the over-latching position against a biasing force of the biasing member, and
by rotating the opening lever being rotated from the second rotational position to the third rotational position, the claw actuating portion is caused to rotate the claw from the non-abutting position to the over-rotated position, and the fork restricting portion is caused to gradually rotate the fork from the over-latching position, through the latching position, to the open position, and then ceases to restrict the rotation of the fork.

* * * * *